(12) United States Patent
Wei

(10) Patent No.: US 7,614,052 B2
(45) Date of Patent: Nov. 3, 2009

(54) SYSTEM AND METHOD FOR DEVELOPING AND DEPLOYING COMPUTER APPLICATIONS OVER A NETWORK

(75) Inventor: Coach K. Wei, Boston, MA (US)

(73) Assignee: Nexaweb Technologies Inc., Burlington, MA (US)

( * ) Notice: Subject to any disclaimer, the term of this patent is extended or adjusted under 35 U.S.C. 154(b) by 655 days.

(21) Appl. No.: 11/039,106

(22) Filed: Jan. 19, 2005

(65) Prior Publication Data

US 2005/0155027 A1     Jul. 14, 2005

Related U.S. Application Data

(63) Continuation-in-part of application No. 10/754,782, filed on Jan. 9, 2004.

(60) Provisional application No. 60/538,010, filed on Jan. 20, 2004.

(51) Int. Cl.
     *G06F 9/45*          (2006.01)
(52) U.S. Cl. ....................................................... 717/176
(58) Field of Classification Search ................. 717/124, 717/170, 140, 176
See application file for complete search history.

(56) References Cited

U.S. PATENT DOCUMENTS 6,209,124 B1 * 3/2001 Vermeire et al. ............. 717/114
6,389,590 B1 * 5/2002 Miller et al. ................. 717/140
6,918,107 B2 * 7/2005 Lucas et al. .................. 717/124
6,981,250 B1 * 12/2005 Wiltamuth et al. ........... 717/170

OTHER PUBLICATIONS

Adele Goldberg, Support for Object-oriented programming, in Concepts of Programming Languages, by Robert W. Sebesta, Addison Wesley, p. 435-485.
Dino Esposito, Afirst look at writing and deploying apps in the next generation of Windows, http://msdn.microsoft.com/Longhorn.

* cited by examiner

*Primary Examiner*—John Chavis
(74) *Attorney, Agent, or Firm*—AKC Patents LLC; Aliki K. Collins

(57) ABSTRACT

A method of developing a computer application by coding a markup document in an XML markup language, coding a business logic component using any programming language, compiling the business logic component into a specific executable code, converting the XML document into a specific markup language document and deploying the converted markup document and the executable code to a client machine running a specific operating system via a network connection. The XML markup document can be converted in any markup language including XUL, SVG, Xforms, XML related languages, HTML, HTML related languages, text, and combinations thereof. The business logic component can be written using any programming language including Java, JavaScript, J#, C#, C, C++, Visual Basic, ActionScript, XSL, XQuery, and XPath, among others. The computer application can run in any operating system including next generation Windows Longhorn, Windows 2000, Linux, Unix, Apple or Palm operating systems, among others.

46 Claims, 15 Drawing Sheets

*FIG. 15*

SYSTEM AND METHOD FOR DEVELOPING AND DEPLOYING COMPUTER APPLICATIONS OVER A NETWORK

CROSS REFERENCE TO RELATED CO-PENDING APPLICATIONS

This application claims the benefit of U.S. provisional application Ser. No. 60/538,010 filed on Jan. 20, 2004 and entitled "System and Method for Developing and Deploying Computer Applications" which is commonly assigned and the contents of which are expressly incorporated herein by reference.

This application is a continuation in part of U.S. application Ser. No. 10/754,782, filed on Jan. 9, 2004 and entitled "System and Method for Network-Based Computing" which is commonly assigned and the contents of which are expressly incorporated herein by reference.

FIELD OF THE INVENTION

The present invention relates to a system and a method for developing and deploying computer applications, and more particularly, to developing computer applications using a combination of a declarative markup language and a procedural code programming language and deploying them over a network.

BACKGROUND OF THE INVENTION

A typical computer application 80 includes a user interface (UI) 82, business logic components 84, and data 86, as shown in FIG. 1. Computer application 80 may be either a traditional client/server application, such as a Microsoft Windows-based application, that runs on a computer equipped with a specific operating system or an HTML web-based application that runs over a network. A Microsoft Windows-based application provides a rich responsive user interface that can be installed in any computer that runs on the Windows operating system and can run offline without the need for a network connection. The Windows-based application is interactive, provides complex functionality and uses real-time operations. A programmer writes an application source code (or business logic code) using C or C# programming language, compiles it for the Windows operating system and installs the compiled bytecode in each computer individually. This deployment mode is time consuming and lacks flexibility because the process of writing, compiling and deploying needs to be repeated every time there is a change in the source code. Furthermore, a Windows-based application cannot run within a web browser.

A web-based application is usually installed in a server 72 (shown in FIG. 3) and includes webpages written in a markup language, such as HTML. A web browser installed in a client computer 73 can download the web application one webpage at a time via a network connection 78 between the client machine 73 and the server 72. Web-based applications are easy to deploy via the network 78 and the UI is easily created using a declarative markup language, such as HTML. However, the UI controls of an HTML-based application are not as rich as the UI controls of a Windows based application, therefore resulting in poor interactivity with the user. Furthermore, web-based applications cannot run offline on a stand-alone client computer without a network connection to a server, have high bandwidth consumption and do not support bi-directional communications.

A next generation Windows operating system called Longhorn is being developed by the Microsoft Corporation. Referring to FIG. 2, a prior art system 90 for writing and deploying a computer application 80 in the next generation Windows Longhorn environment includes coding a markup document 92, coding a business logic code 94, combining document 92 and code 94 into one entity 95 and compiling the combined entity 95 into an executable bytecode 98 using a compiler 96. The executable bytecode 98 is installed in a client machine where it gets executed by an execution engine 99 in the client runtime environment (CRE). The markup document 92 is written using a declarative Extensible Application Markup Language (XAML) language and the business logic code 94 is written in C#. The compiler 96 is a .NET CLR compiler and the executable bytecode 98 is a .NET CLR bytecode. The execution engine 99 is a .NET CLR engine with Longhorn services. The business logic code 94 may also be written using Visual Basic™ .NET, JScript™ .NET, or other .NET-compatible languages. This process of writing, compiling and deploying needs to be repeated every time there is a change either in the markup document code 92 or in the business logic code 94. Furthermore, the process is currently available only for the .NET CLR execution engine with Longhorn services 99 and for the particular combination of XAML markup language for the markup document 92 and the .NET compatible languages for the business logic code 94. The Longhorn environment and the process of writing and deploying applications within this environment are described in an article entitled "A first look at writing and deploying applications in the next generation of windows" by Dino Espsosito published in the MSDN magazine, the contents of which are expressly incorporated herein by reference.

As was mentioned above, this prior art system and method of writing, compiling and deploying computer applications in the next generation of Windows environment is not flexible because the compiled bytecode of the combined business logic component and the markup document needs to be recompiled and reinstalled every time there is a change either in the business logic component or in the markup document. The entire application needs to be re-deployed. The XAML documents cannot be modified or generated at runtime, which significantly limits programming flexibility. Furthermore this type of computer applications can only run in the specific next generation Windows environment and are not compatible with other existing operating systems including the current version of Windows 95/98/2000/ME/XP, Linux, Unix™, Macintosh™ or Palm™ operating systems, among others. The footprint of the compiled bytecode of the combined business logic component and the markup document can be very large ("fat client"), which in turn results in network bandwidth limitations and server or client machine storage limitations.

Accordingly, there is a need for system and a method of developing and deploying web-based computer applications that can run in any type of client environment and in any operating system, online or offline and can be modified on the fly. Furthermore, there is a need for a system and a method of deploying Longhorn applications and other prior art existing applications to other client environments, thereby overcoming the Longhorn inflexibility and the limited functionality of the prior art environments.

SUMMARY OF THE INVENTION

In general, in one aspect, the invention features a method of developing and deploying a network application in a distributed computing system that includes at least a server and at least a client machine and where the client machine is adapted to connect to the server via a network. The method includes the following steps:

A. Developing a server-side application having at least one markup document and at least one business logic component. The markup document is written using any declarative Extensible Markup Language (XML) and the business logic component is written using any programming language.

B. Compiling the business logic component into a specific executable code using a compiler. The compiler is adapted to receive a business logic component written in any programming language and to compile the business logic component into a specific executable code that can be executed by a specific execution engine in the client machine.

C. Converting the markup document into a specific markup language document using a markup language converter. The markup language converter is adapted to receive a markup document written in any XML language and to convert the markup document into a specific markup language document that is compatible with a specific client runtime environment (CRE) of the client machine.

D. Deploying the specific markup document and the specific executable code to the client machine via the network.

Implementations of this aspect of the invention may include one or more of the following features. The specific markup language document and the specific executable code may be combined into one entity before the deploying to the client machine. The specific markup language document may be cached by a client cache and the specific executable code may be executed by the specific execution engine in the client machine The compiled specific executable code and the converted specific markup language document may be cached by a server cache and the their deployment may occur from the server cache. The markup document and the business logic component may also be cached by the server cache. The markup document may be converted into a binary executable code. The compiling of the business logic component and the converting of the markup document may occur on the fly and upon a request by the client machine. The particular type of the specific client machine may be detected by the server before the compiling and the converting. The at least one markup document may be written in HTML language and the server markup language converter may convert the HTML markup document into an XML markup document. The specific markup language may be XML, XML User Interface Language (XUL), Scalable Vector Graphics (SVG), XForms, XML related languages, Hyper Text Markup Language (HTML), HTML related languages, text, or combinations thereof. The programming language may be C, C++, C#, Java™, Javascript™, VBScript, ActionScript™, Visual Basic™, XSL™, XQuery™, XPath™, or a proprietary programming language. The specific execution engine may be .NET CLR, JVM™, Flash Player™, or Javascript™ engine. The specific executable code may have a format of .NET CLR, Java™ class format, or Macromedia Flash™ binary format. The network may be the World Wide Web (www), the Internet, a wide area network (WAN), a local area network (LAN), a personal area network (PAN), a telecommunication network, a virtual private network (VPN) or a wireless network. The client machine may be a desktop computer, a workstation, a Linux machine, computing circuits, a laptop computer, a handheld device, a television, a telephone, a smart phone, a mobile phone, a personal digital assistant (PDA), a pager, wireless computers, or combinations thereof.

In general, in another aspect, the invention features a distributed computing system for developing and deploying a smart client application from a server to a client machine via a network, that includes the following components:

A. A server-side application having at least one markup document and at least one business logic component. The markup document is written using any declarative Extensible Markup Language (XML) and the business logic component is written using any programming language.

B. A compiler for compiling the business logic component into a specific executable code. The compiler is adapted to receive a business logic component written in any programming language and to compile the business logic component into a specific executable code that can be executed by a specific execution engine in the client machine.

C. A markup language converter for converting the markup document into a specific markup language document. The markup language converter is adapted to receive a markup document written in any XML language and to convert the markup document into a specific markup language document that is compatible with a specific client runtime environment (CRE) of the client machine.

D. A network server for deploying the specific markup document and the specific executable code to the client machine via the network.

In general, in another aspect, the invention features a compiler adapted to receive a business logic component written in any programming language and to compile the business logic component into a specific executable code that can be executed by a specific execution engine.

Implementations of this aspect of the invention may include one or more of the following features. The compiler may include a plurality of specific programming language universal compilers and a server compiler control logic. The server compiler control logic detects the type of a specific client engine, invokes compiling and caching of a specific client engine executable code and delivers the executable code to the client engine. Each of the specific programming language universal compilers receives an input file written in any programming language and compiles the input file into a specific executable code that can be executed by a specific execution engine. The specific programming language may be C, C++, C#, Java™, Javascript™, VBScript, ActionScript™, Visual Basic™, XSL, XQuery™, XPath™, or a proprietary programming language. The specific execution engine may be .NET CLR, JVM™, Flash Player™, or Javascript™ engine.

In general, in another aspect, the invention features a markup language converter adapted to receive a markup document written in any XML markup language and convert the markup document into a specific markup language document.

Implementations of this aspect of the invention may include one or more of the following features. The markup language converter may include a control logic and specific markup language converters. The control logic detects the type of a specific client engine, invokes a specific markup language converter that is appropriate for the specific client engine and converts the markup document into the specific markup language document. The specific markup language converters may be XUL converter, SVG converter, XML converter, or HTML converter.

In general, in yet another aspect, the invention features a method of converting a prior art web application into a client application capable of running in distributed computing system, wherein the prior art web application includes at least one HTML markup document and at least one business logic code and wherein the distributed computing system includes at least a server having a Server Runtime Environment (SRE) and at least a client machine having a Client Runtime Environment (CRE) and wherein the client machine is adapted to connect to the server via a network. The method includes the following steps:

A. Converting the HTML markup document into an XML markup language document using a server markup language converter contained within the SRE.

B. Deploying the XML markup document and the at least one business logic code separately from each other to the client machine via the network.

C. Executing the at least one business logic code and the XML markup document by the CRE.

Implementations of this aspect of the invention may include one or more of the following features. The method may further include compiling the business logic code into an executable bytecode. The method may further include providing an additional business logic code by the CRE. The prior art web application may be a Longhorn application.

In general in yet another aspect, the invention features a stateful method of processing an XML markup document within a distributed computing system, wherein the distributed computing system includes at least a client machine having a Client Runtime Environment (CRE). The method includes the following steps:

A. Receiving the XML markup document by the CRE.

B. Parsing and holding the XML document's state by the CRE.

C. Receiving XML commands by the CRE, and performing operations comprised in the XML commands upon the XML document by the CRE.

D. Updating the XML markup document's state by the CRE.

Implementations of this aspect of the invention may include one or more of the following features. The XML markup document may be written in a markup language such as XAML, XML User Interface Language (XUL), Scalable Vector Graphics (SVG), XForms, XML related languages, Hyper Text Markup Language (HTML), HTML related languages, text, or combinations thereof. The CRE may hold the XML markup document's state in a Document Object Model (DOM). The XML commands may be add, remove, update, insert, delete, sort, or search.

In general, in another aspect the invention features a method of developing and deploying a network application in a distributed computing system wherein the distributed computing system includes at least a client machine having a Client Runtime Environment (CRE). The method includes the following steps:

A. Developing a server-side business logic using Enterprise Java Beans (EJB), .NET objects, script language, Perl language, or PHP language.

B. Developing a server-side presentation layer using Java Server Page (JSP), Servlet, Active Server Page (ASP), ASP-.NET, Perl, or PHP.

C. Generating XML documents and sending the XML documents to the CRE.

Implementations of this aspect of the invention may include one or more of the following features. The method may further include receiving the XML documents by the CRE, processing the XML documents by the CRE and presenting a rich User Interface (UI) by the CRE. The method may further include processing the XML documents by the SRE and sending the processed XML documents to the CRE and presenting a rich User Interface (UI) by the CRE.

In general, in yet another aspect the invention features an improved Extensible User-Interface Language (XUL) that includes a series of Extensible Markup Language (XML) tags for allowing different operating platforms to exchange data that describe a user interface (UI) of an application. The improved XUL is designed to run in a distributed computing system that has at least a server having a Server Runtime Environment (SRE) and at least a client machine having a Client Runtime Environment (CRE) and wherein the client machine is adapted to connect to the server via a network. The improved XUL includes means for adding, removing and updating UI components on the fly using XML instructions, customized features that require custom coding, and means for providing server-side integration, wherein the CRE routes events of interest back to the SRE.

Among the advantages of this invention may be one or more of the following. This invention provides a computing architecture that combines the Client/Server architecture and the Web architecture. We call it the "Smart Client Architecture". This "Smart Client Architecture" enables applications to be written in the same way as web applications are written today, and allows these web applications to be universally deployed to any client devices with any operating system, while maintaining the same performance/functionality of client/server applications. This "Smart Client Architecture" also enables easy conversion of existing web applications, including conversion of Longhorn applications. The "Smart Client Architecture" enables writing, deploying and execution of a computer application from a central server to any client machine connected to the server via a network connection. The network connection may be a low bandwidth network. The client machines may include any type of operating systems and devices. The network application includes markup documents, business logic components and an object-oriented binding mechanism binding the markup documents to the business logic components and the reverse. The markup documents may be converted to any type of a markup language including among others, XML, XUL, SYG, Xforms, XML related languages, HTML, HTML related languages, text, and combinations thereof. The business logic components may include source code written in any programming language including among others, Java™, JavaScript™, J#, C#, C, C++, Visual Basic™, ActionScript™, XSL™, XQuery™, and XPath™. A compiler system converts the source code to any type of executable bytecode. This compiler system configuration provides flexibility in both the programming aspect of the application and the execution aspect of the application. The so developed network applications can run equally well in all environments, cross-platform and cross-device. Furthermore, the development of these applications is faster and easier, resulting in lower IT costs and higher ROI. Enterprise Internet Applications demand absolute security and data protection. The "Smart Client Architecture" maintains every application user as a stateful, persistent session at the server. This permits the automatic resynchronization of returning off-line, occasionally connected, or accidentally disconnected users. The computing architecture also provides for mobile and Occasionally Connected Computing (OCC). Enterprise Internet Applications also require the most accurate and up-to-date data and functionality. Data and user interface updates are automatically pushed to the client by the server, asynchronously and in real-time. The "Smart Client Architecture" utilizes ultra-thin communications technology that conserves bandwidth by sending incremental updates of only the information that has changed on the client, rather than an entire page of web code. This, along with an intelligent server compression technology, allows the applications of this invention to reduce bandwidth and server cycles by up to 90%.

The user benefits include:
  Higher productivity for end users due to the more effective application user interface
  Faster and cheaper development environment because the Presentation Layer work has been done by the server, and
  Better ROI (lower bandwidth costs, thin client device possible, lower maintenance costs) as a result of the reduced impact on the infrastructure.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Figure 15:
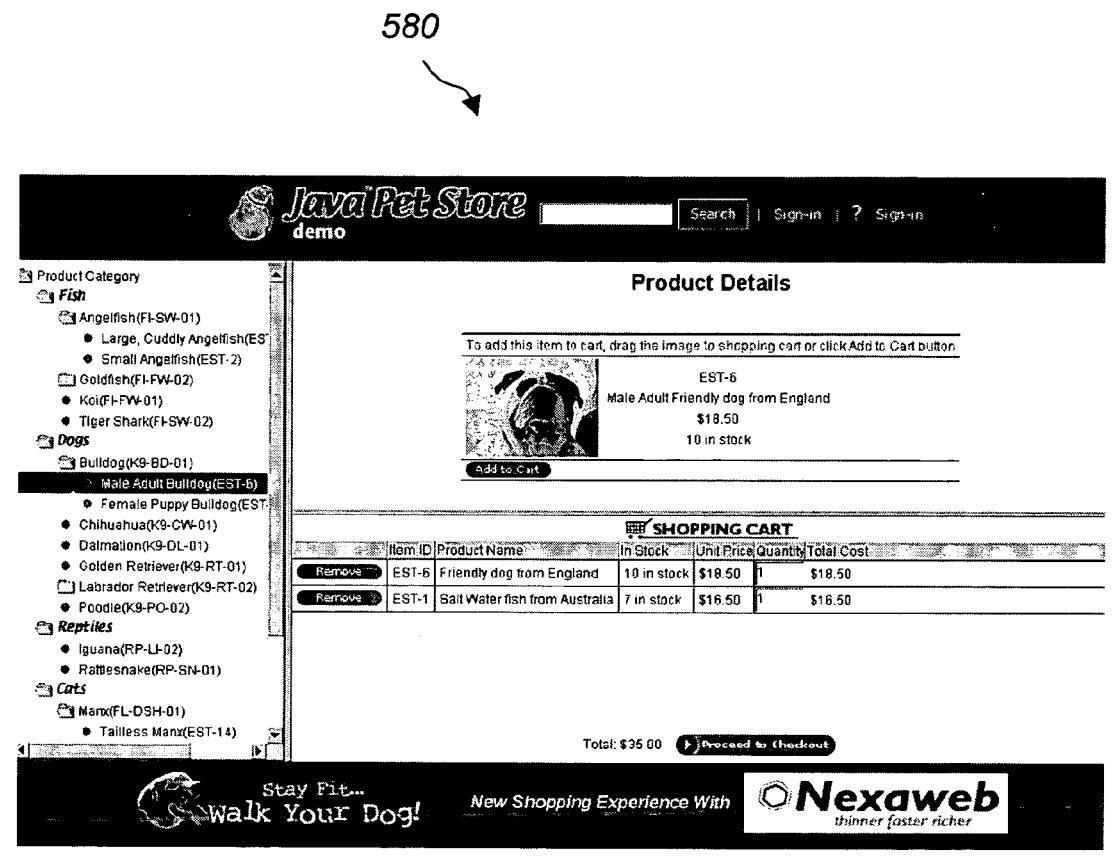

FIG. 15 is a Nexaweb-enabled Pet Store User Interface.

DETAILED DESCRIPTION OF THE INVENTION

Figure 1:
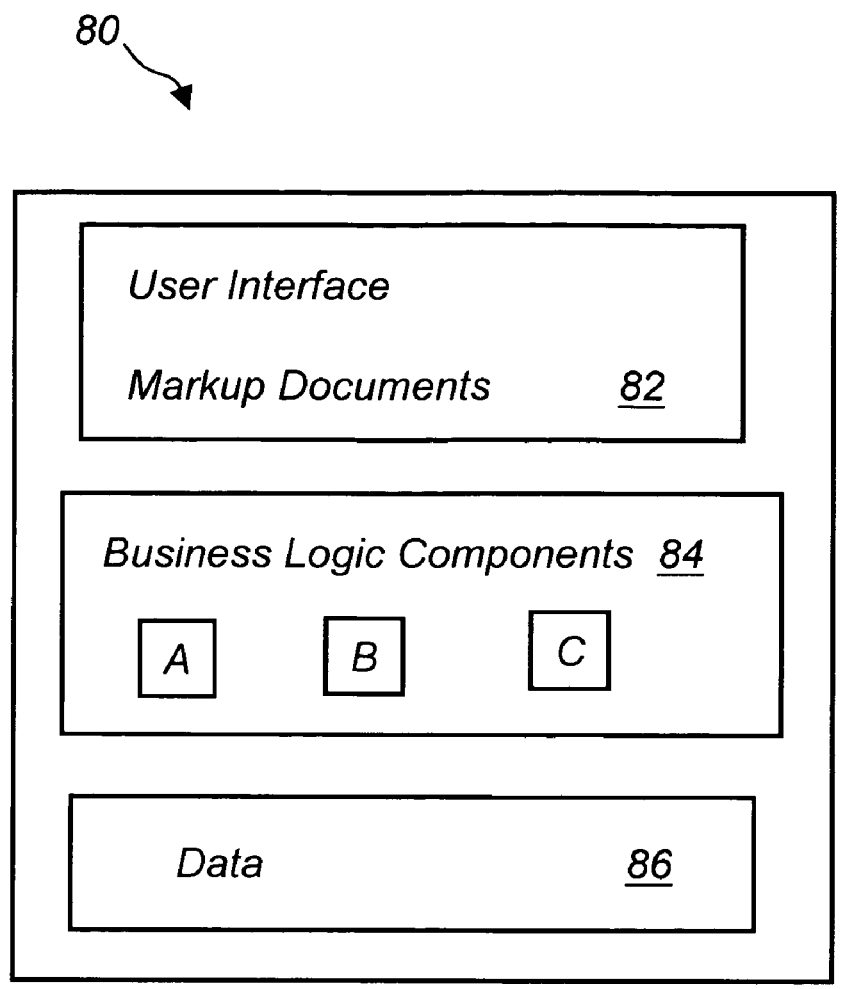
FIG. 1 is a block diagram of a typical computer application.
Figure 2:
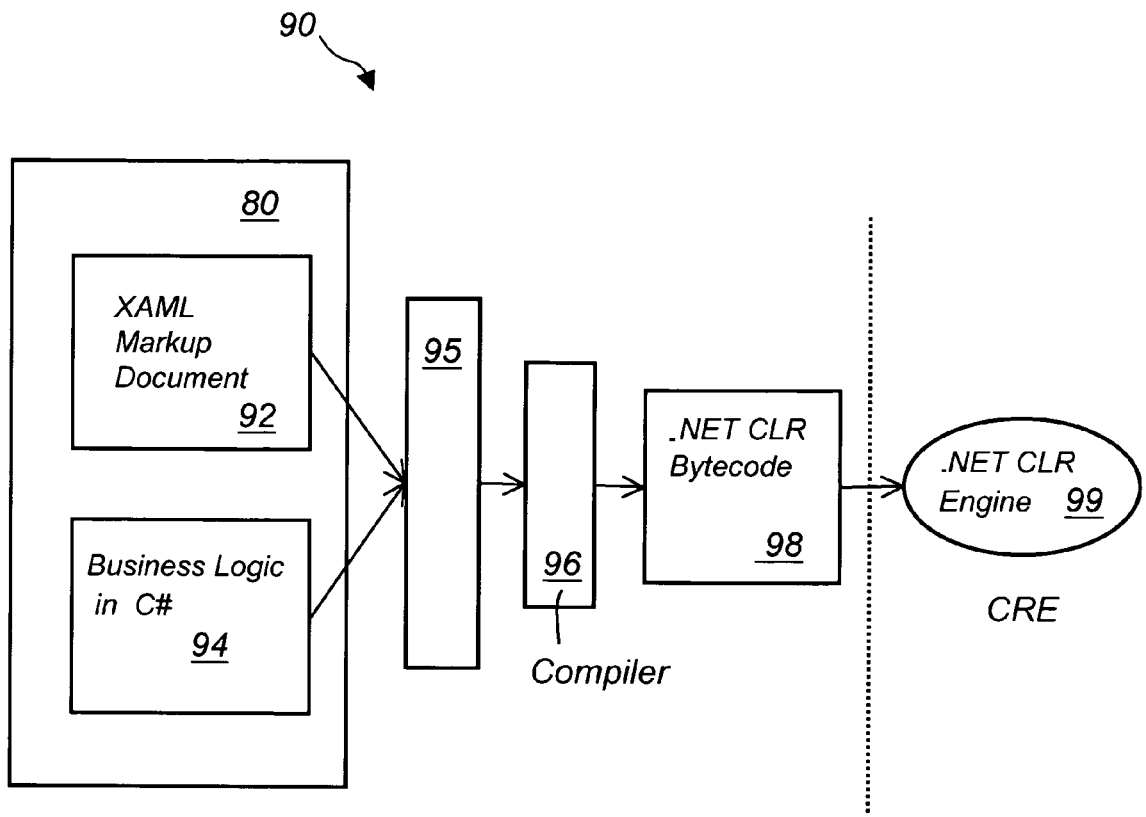
FIG. 2 is prior art process for writing, compiling, deploying and executing a computer application in the next generation of Windows operating system.
Figure 3:
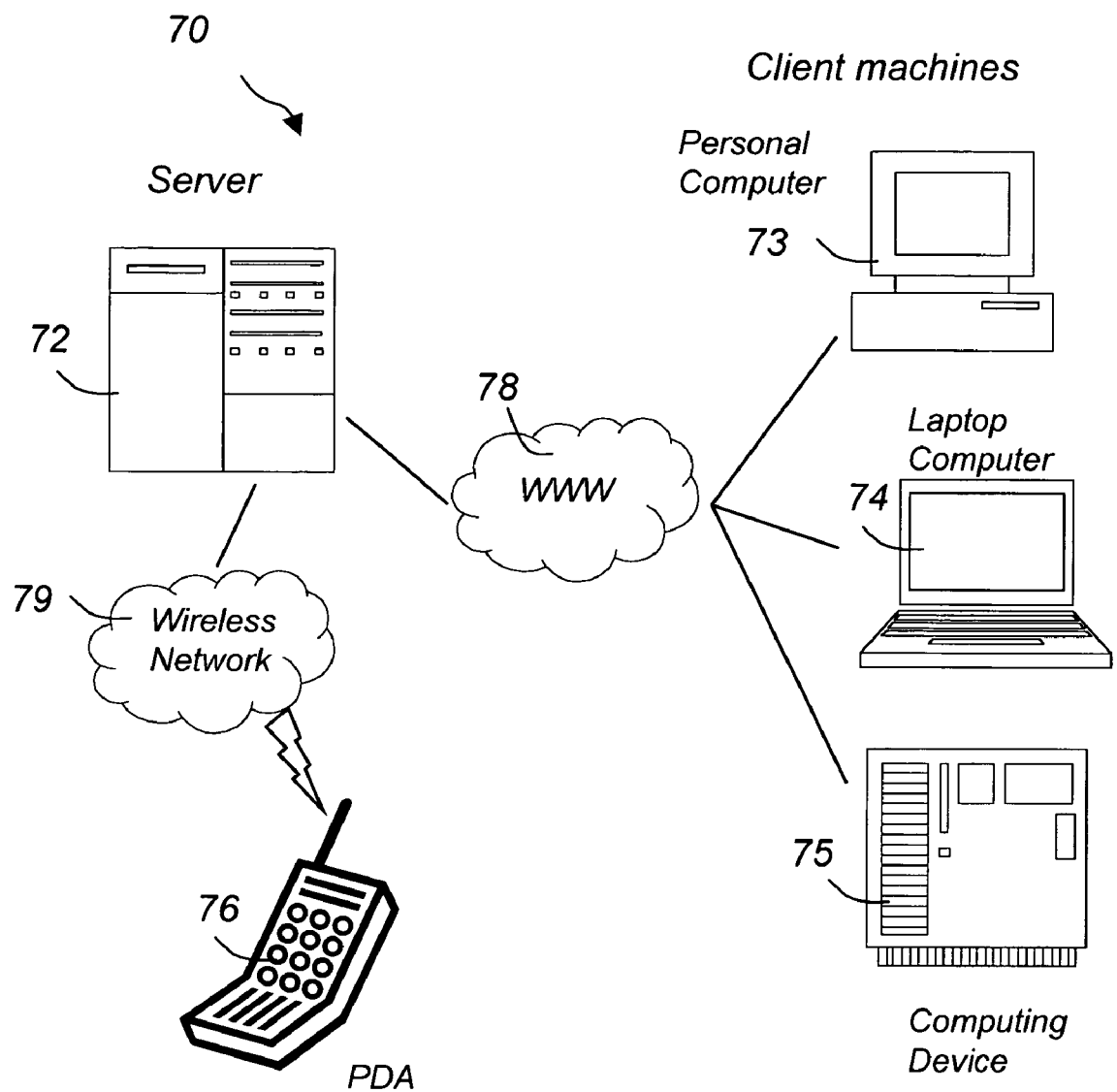
FIG. 3 is an example of a network-based computing system.

Referring to FIG. 3, a network-based computing system 70 includes a server 72 and client machines 73, 74, 75, and 76. The client machines include a personal computer 73, a laptop computer 74, other computing devices 75, and a wireless communication device 76. Client machines 73, 74 and 75 are connected to the server 72 via a network connection 78. Client machine 76 is connected to the server 72 via a wireless network connection 79. There may be several additional client machines including personal computers, laptop computers, Linux machines, workstations, computing circuits, and wired communications devices, such as telephone and television. Network connection 78 may be the Internet, the World Wide Web (WWW), a Wide Area Network (WAN), a Local Area Network (LAN), a Personal Area Network (PAN) or a telecommunication network. The wireless communication device 76 may be a mobile phone, a personal digital assistant (PDA), a pager, a wireless laptop computer, a personal computer, a television, and programmable versions thereof or combinations thereof. The wireless network 79 may be a wireless wide area network (WWAN), a wireless local area network (WLAN), a wireless personal area network (WPAN) or a private communication network.

Figure 4:
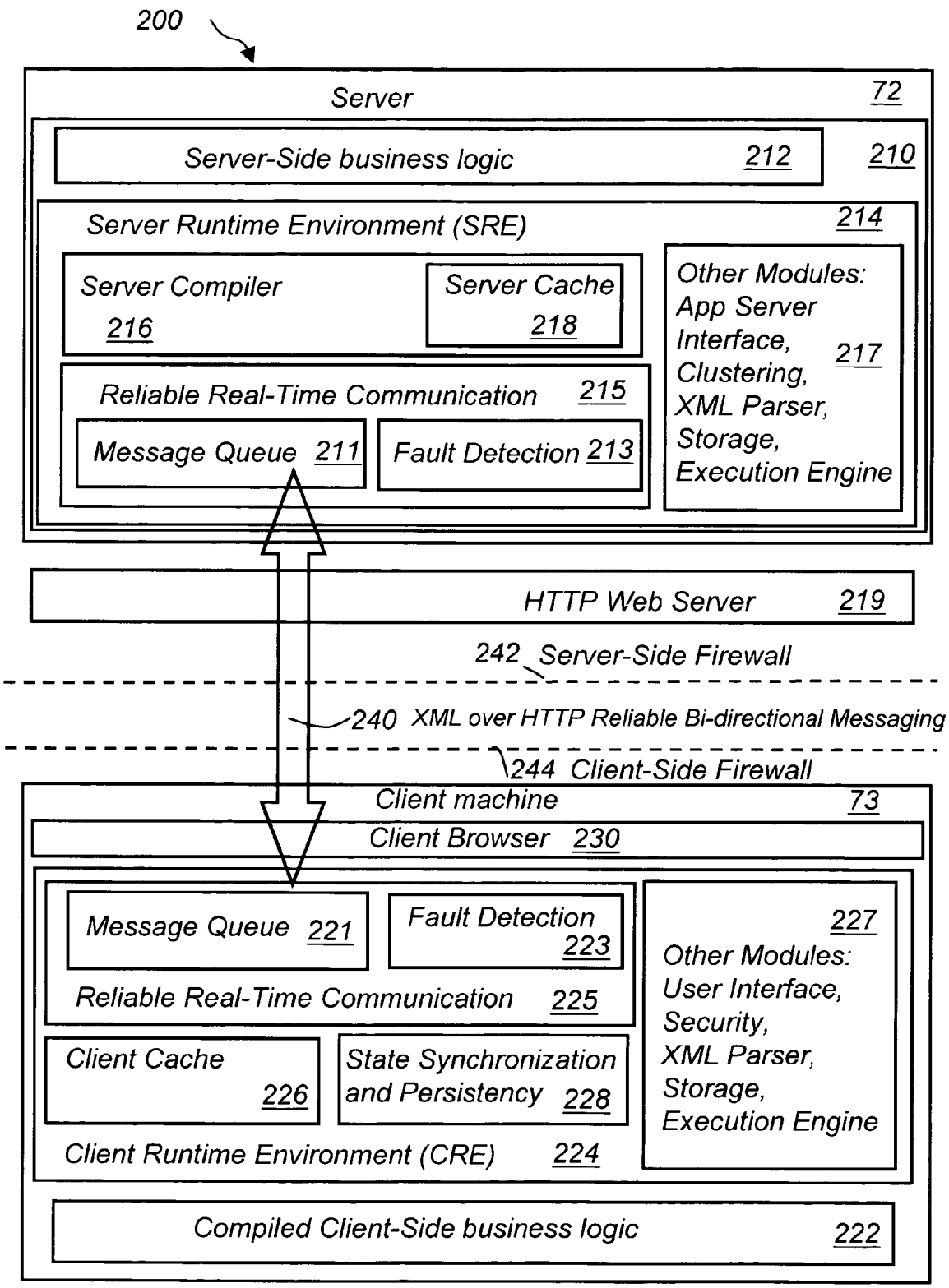
FIG. 4 is a block diagram of the software and hardware components of a simple network-based computing system including a server and a client machine, according to this invention.

Referring to FIG. 4, a block diagram of the software components of the server 72 and the client machine 73 includes the following. The server 72 runs behind a web server 219, and runs server-side business logic 212. The web server 219 delivers markup documents or electronic messages generated by the server side business logic 212 to a client web browser 230 residing inside the client machine 73. Electronic messages are communication messages delivered electronically for information exchange. Markup documents are electronic documents, i.e., files, written using a markup language such as XML or HTML. A markup language is a conventional language for describing the contents of an electronic document that is to be viewed or printed on a computer output device such as a computer monitor. A markup language document may contain text, images, JavaScript, and hyperlinks, among others. A real time, bidirectional, reliable messaging system 240 transmits messages between the client web browser 230 and the web server 219 over an HTTP connection. The server 72 includes in addition to the server side business logic 212 a Server Runtime Environment (SRE) 214 that runs behind the HTTP server 219 and inside the server 72. The SRE 214 also includes a server compiler 216, a server cache 218, a communications module 215, and other functional modules 217. The functional modules 217 may be an Application Server Interface, an XML Parser, Clustering, Storage, and an Execution Engine. The application server interface module enables the SRE 214 to run inside the application server 210 and enables applications inside the application server 210 to access the SRE's functionalities. The XML Parser module is responsible for parsing XML documents that come from the various client machines or other information sources such as other backend connections. The parsing results may be stored in the Storage module. The clustering module provides support for clustering the SRE and the execution engine module executes the compiled server-side business logic 212.

The client machine 73 includes a client runtime environment (CRE) 224 that runs outside the client web browser 230 and client-side business logic 222. In other embodiments the CRE runs inside the client web browser 230. The client side business logic 222 includes markup documents and business logic. The client machine 73 is protected by a client side firewall 244 and the web server 219 is protected by a server side firewall 242. The CRE 224 processes markup documents and executes the client-side business logic 222. The CRE 224 includes a client cache 226, a communication module 225, a state synchronization and persistency module 228 and other functional modules 227 such as an XML parser, a user interface, storage, security, and an execution engine. The XML Parser is responsible for parsing XML documents that come from the application server 210. The parsing results may be stored in the client cache 226 as part of the application's client side state. The user interface module is responsible for displaying the user interface and interacting with the user according to the application's markup document description. The execution engine module is capable of running client side business logic 222. The client cache 226 maintains the application's client side state and is updated by the CRE automatically. The synchronization and persistency module 228 is responsible for synchronizing the client cache 226 with the application server 210, and saving and/or retrieving the client cache 226 from persistent storage.

The CRE 224 is centrally managed by the SRE 214. The CRE 224 is automatically downloaded from the server 72 and installed in the client machine 73 the first time a user access a client application. After the initial installation, the SRE 214 automatically manages the versioning and updating of the CRE 224. Different CREs 224 are used for the different client platforms. For example, different CREs are used for a Java™ Virtual Machine, a .NET CLR, or a Flash Player™. The executable business logic formats of these three client platforms are: Java™ bytecode, .NET CLR bytecode and Flash™ bytecode, respectively. The business logic 222 is delivered in three different executable code formats for these three client platforms, accordingly.

Figure 5:
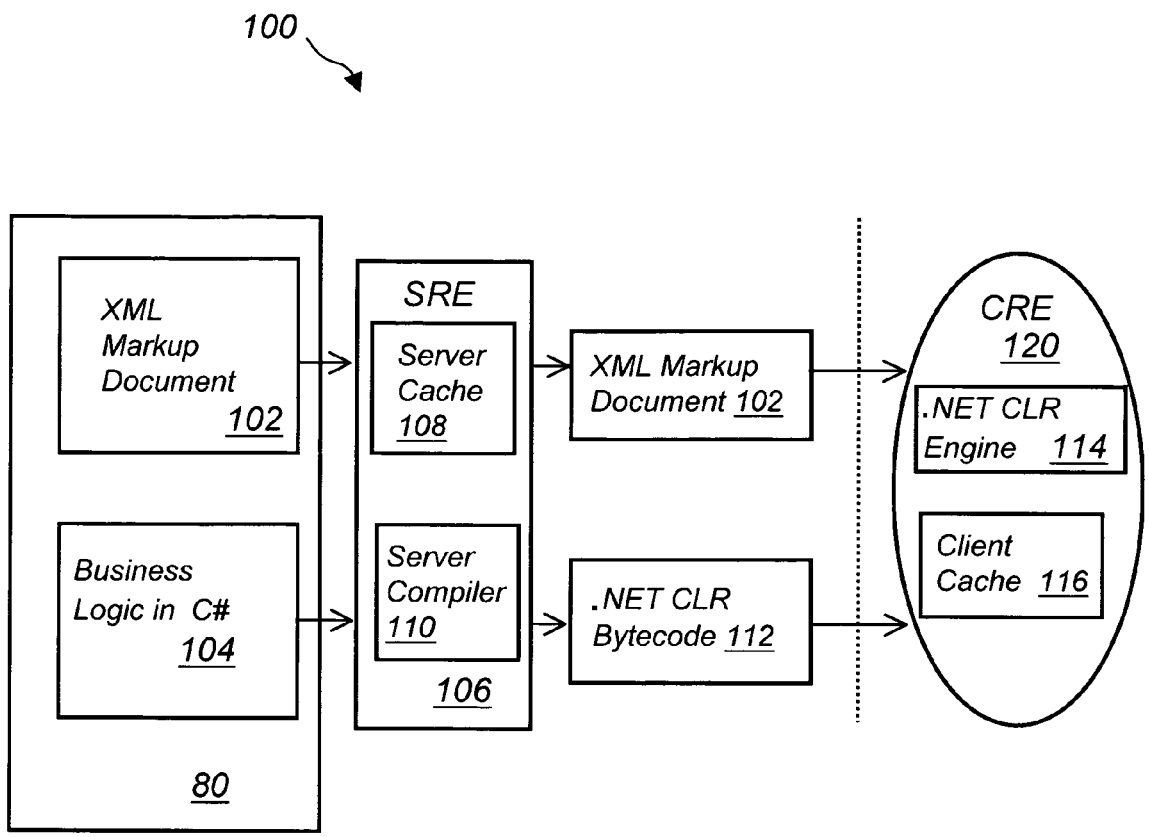
FIG. 5 is a block diagram of a specific embodiment of the process of writing, compiling, deploying and executing a computer application according to this invention.

Referring to FIG. 5, a system 100 for writing and deploying a computer application 80 in any computing environment and in particular in the network-based computing environment of FIG. 3, includes first coding a markup document 102 and a business logic component 104. Next, the business logic component 104 passes through a server compiler 110 where it gets parsed and compiled into an executable bytecode 112. The server compiler is included in a Server Runtime Environment (SRE) 106 that can be installed in any server computer 72, shown in FIG. 3. In addition to the server compiler 110 the SRE includes a server cache 108 for storing the markup documents, the business logic components and the compiled bytecodes. A client machine 73 that can connect to the server 72 via a network 78 (shown in FIG. 3) receives the markup document 102 and the executable bytecode 112 via the network connection 78. The client machine 73 has a CRE 120 that includes an execution engine 114 and a client cache 116. In the example of FIG. 5, the markup document is written using XML markup language and the business logic component 104 is written in C#. In this case, the server compiler 110 is a commercially available .NET CLR compiler that compiles the C# code into .NET CLR bytecode 112 that can be executed by a .NET CLR engine 114. In another example 150, shown in FIG. 6, the markup document 102 is written using a XAML markup language and the business logic component 104 is programmed using any programming language. In this case the SRE 106 includes a server compiler system 160, a XAML converter 155 and a server cache 108. The server compiler system 160 receives a business logic component 104 written in any programming language and compiles it in a specific bytecode 166 that is supported by a specific engine 174 of the CRE 120. The XAML converter 155 receives markup documents 102 written in a XAML markup language and converts them into CRE specific markup language documents 162, such as XUL, SVG, Xforms or other XML related languages. The server cache 108 stores the markup documents, business logic components, the converted markup documents and the compiled bytecodes.

Figure 7:
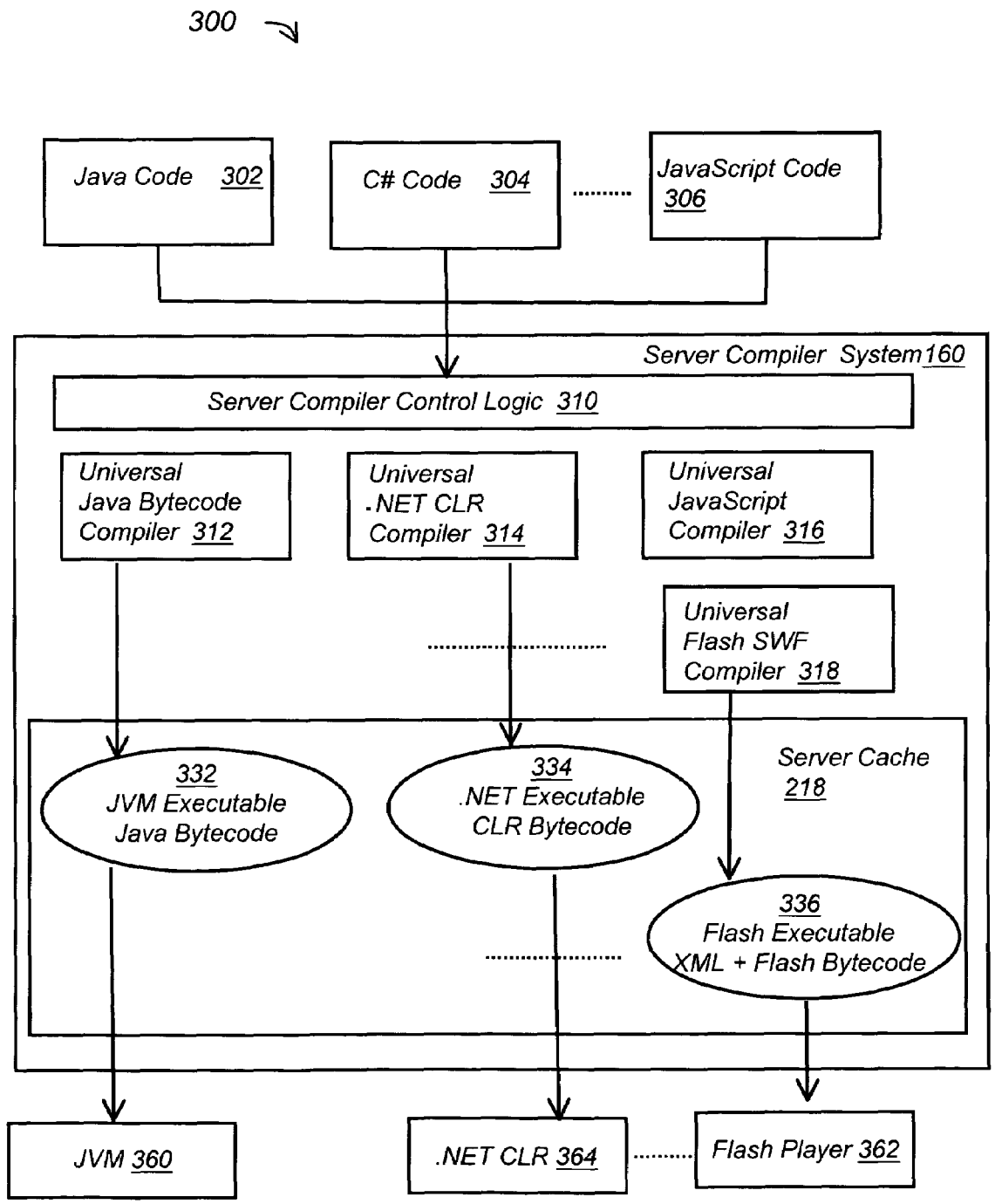
FIG. 7 is a schematic diagram of the server compiler system of FIG. 6.

Referring to FIG. 7, the server compiler 160 is a software program that translates source code written in any supported programming language into executable code of any supported executable format. As shown in FIG. 7, the source code is written in a programming language, such as Java™ 302, C# 304, or JavaScript™ 306, among others. The supported executable formats are Java™ bytecode 332, .NET CLR bytecode 334, or Flash™ bytecode 336, among others, depending on the client platform. For example, when the client platform is running a Java™ Virtual Machine 360, all input source files, no matter which language they are being written in, are compiled into Java™ bytecode executable files by the server compiler 160. Similarly, if the client platform is running a .NET CLR, all source code files are compiled into .NET CLR bytecode.

The server compiler 160 includes a plurality of specific universal compilers including among others, a universal Java™ Bytecode compiler 312, a universal .NET CLR (Common Language Runtime) compiler 314, a universal JavaScript™ compiler 316, and a universal Flash™ SWF compiler 318. The server compiler 160 also includes a server compiler control logic 310 that detects the type of the client platform, invokes compiling and caching of a client platform appropriate executable code and delivers the appropriate executable code to the corresponding client platform. When the server compiler 160 receives a request from a certain client machine, the control logic 310 first characterizes the client machine to see which executable format is supported by this client machine. If a compiled executable code of the supported format is available in the server cache 218 and the source file has not changed since the last compilation, the server compiler control logic 310 sends the cached executable code to the client machine directly. If the source file has been changed since the last compilation, the control logic 310 prompts the server compiler 160 to retrieve the source file, compile the source file into the appropriate executable code, cache the executable code in the server cache 108 and send the executable code to the client machine 73. Each universal compiler receives an input file written in any programming language, such as Java™, C#, JavaScript™, C, C++, Visual Basic™, and delivers an output file in one executable format specific to a certain client platform. The input files 302, 304, 306 and the output files 332, 334, 336 may also include markup documents.

Figure 8:
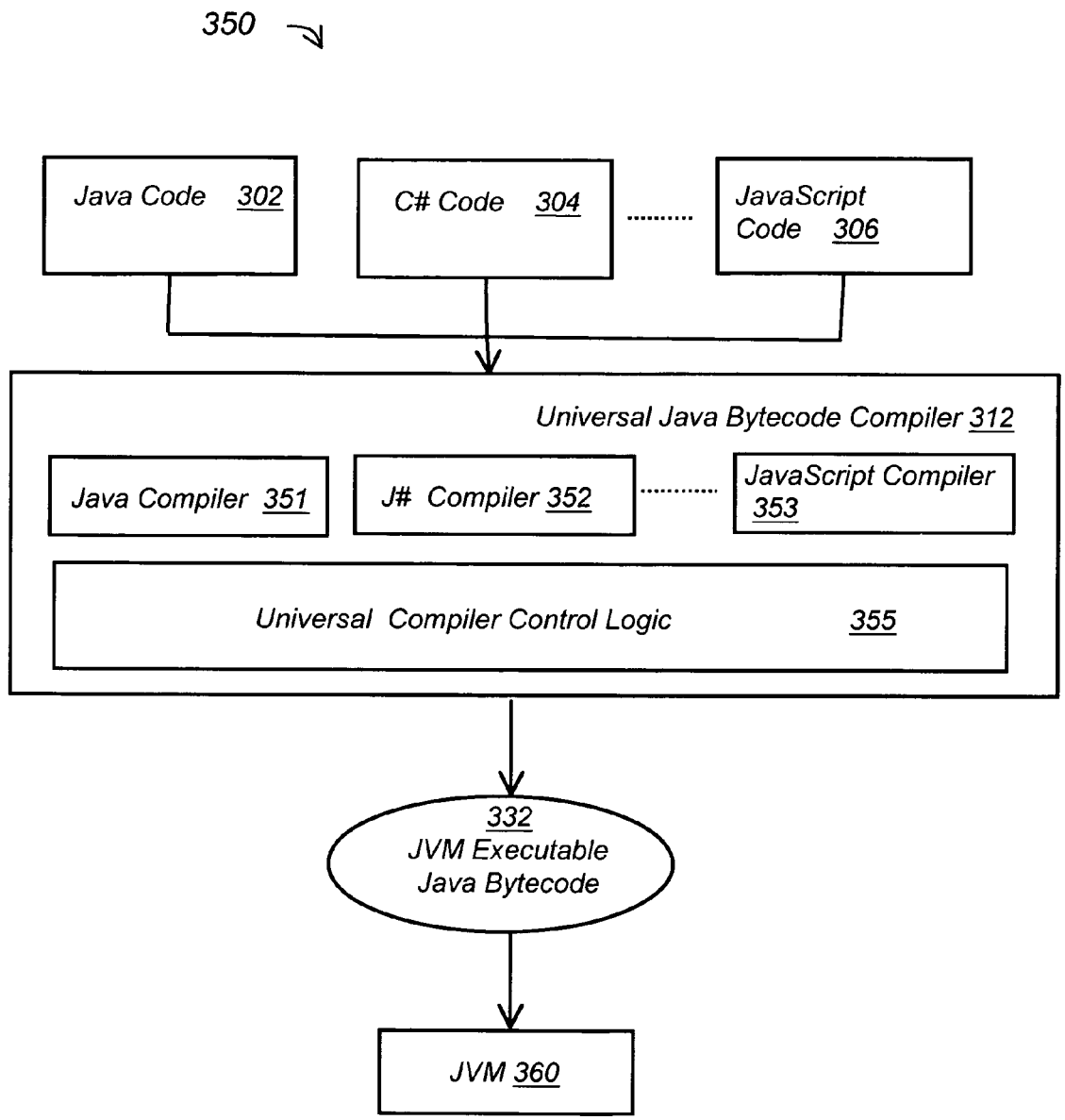
FIG. 8 is a detailed block diagram of the universal Java bytecode compiler of FIG. 7.

Referring to the example of FIG. 8, the universal Java bytecode compiler 312 receives source code files written in programming languages such as Java™ 302, C# 304, JavaScript™ 306, among others, and delivers a Java™ Virtual Machine executable Java™ bytecode file 332. The universal Java™ bytecode compiler 312 includes a plurality of custom developed language compilers, such as JavaScript™ compiler 353, a plurality of commercially available language specific compilers, such as Java compiler 351, J# compiler 352, C# compiler, among others, and a control logic 355. Java™ compiler 351 is commercially available from Sun Microsystems of Santa Clara, Calif., J# compiler 352 is commercially available from Microsoft of Redmond Wash. The JavaScript™ compiler 353 is custom developed by Nexaweb and compiles JavaScript™ files into Java™ bytecode.

Similarly, the universal .NET CLR compiler 314, the universal JavaScript™ compiler 316, and the universal Flash™ SWF compiler 318, receive input files written in any programming language and deliver bytecode files executable by a .NET CLR engine, a JavaScript™ engine, and a Flash Player™, respectively. The control logic 355 module includes rules for handling the various programming language codes and processes the input files. When an input file is received, control logic module 355 checks which language the source code file is being written in and selects the appropriate language specific compiler to compile the source code file into executable code in the desired executable format. For example, the control logic 355 of the Universal Java™ bytecode compiler 312 would select the JavaScript™ compiler 353 to compile JavaScript™ source files and Java™ compiler 351 to compile Java™ source files.

Figure 9:
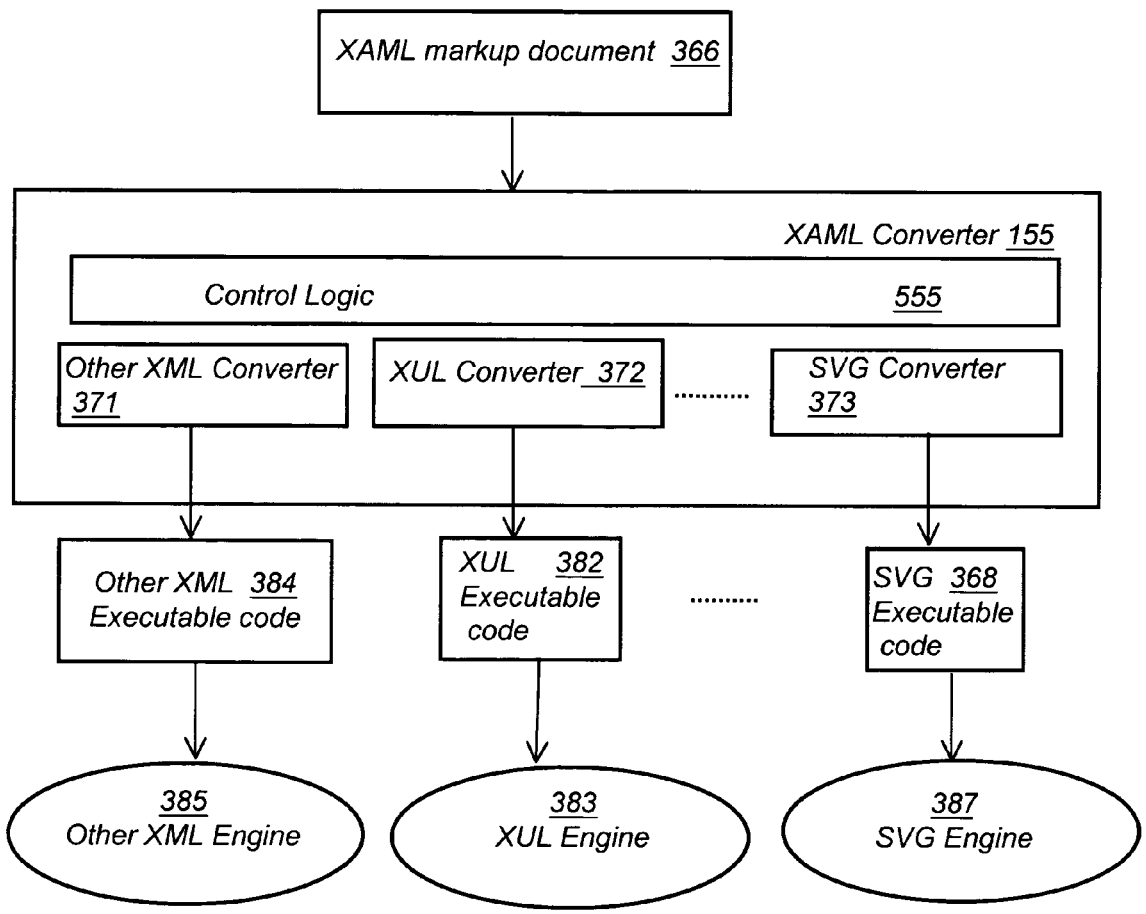
FIG. 9 is a detailed block diagram of the XAML converter of FIG. 6.

Referring to FIG. 9, the XAML converter 155 includes a plurality of markup language specific converters, such as XUL converter 372, SVG converter 373, and other XML converters 371, among others, and a control logic 555. The control logic 555 is responsible for selecting and invoking a markup language specific converter to convert a source file written in XAML markup language 366 into specific markup language documents 382, 384, 388 appropriate for the CRE specific engine 383, 385, 387, respectively.

Figure 6:
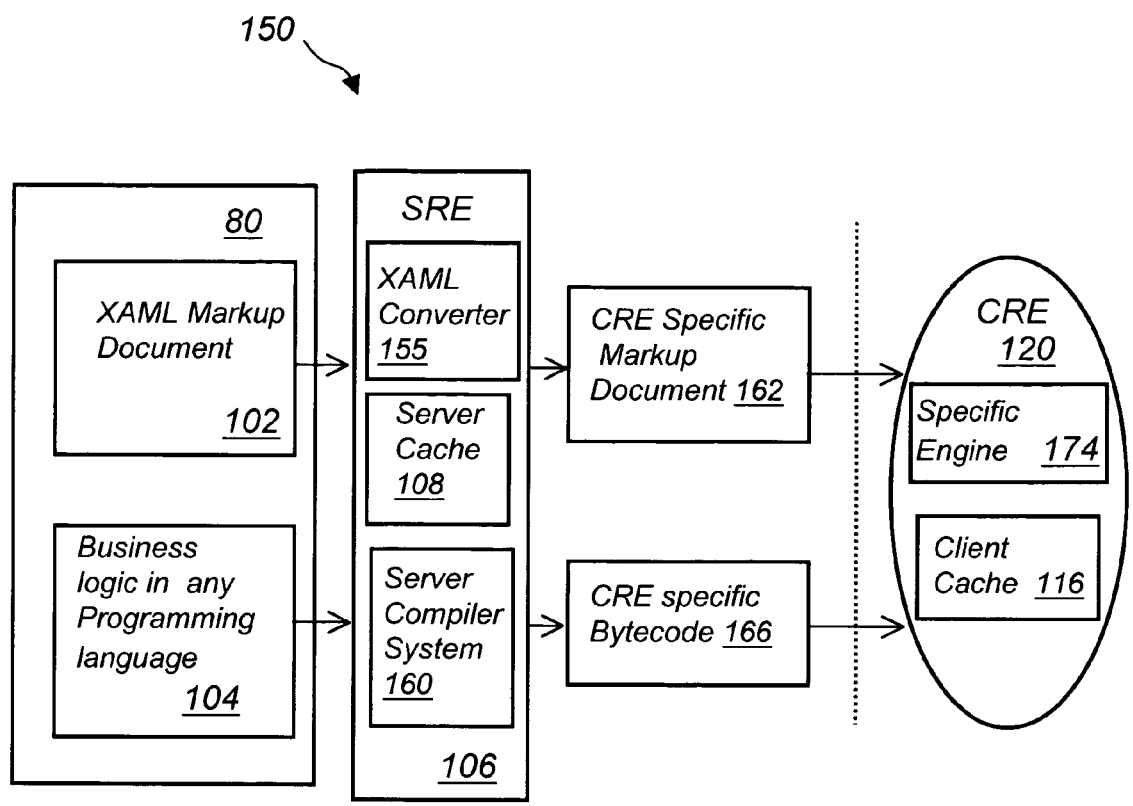
FIG. 6 is a block diagram of another embodiment of the process of writing, compiling, deploying and executing a computer application according to this invention.

The compiled bytecode files 332, 334, 336, and the converted CRE specific markup documents 382, 384, 388 may be stored in the server cache 108, shown in FIG. 6. The SRE compiles or converts the business logic components or markup documents, respectively, on the fly. When the CRE 120 of a client machine 73 requests a specific business logic component, the SRE 106 determines the particular executable format of the CRE 120 and checks if this particular format has already been compiled and is stored in the server cache 108. If the particular compiled bytecode exist in the server cache 108 and the code has not been modified since the last time it was compiled the SRE 106 downloads the executable file to the CRE 120 and stores it in the client cache 116. Otherwise, the SRE 106 will invoke the server compiler 160 and first compile the requested code in the particular executable format and then download it to the CRE 120 and store it in the client cache 116. Similarly, when the CRE 120 requests a specific markup document, the SRE 106 determines the particular executable format that the CRE 120 supports and checks if this particular format has already been converted and is stored in the server cache 108. If the supported converted markup document exist in the server cache 108 and the document has not been modified since the last time it was converted the SRE 106 downloads the converted document to the CRE 120 and stores it in the client cache 116. Otherwise, the SRE 106 will invoke the markup language converter 155 and first convert the requested document in the particular format and then download it to the CRE 120 and store it in the client cache 116.

This invention utilizes object-oriented programming methodology to develop object-oriented application programs. Object-oriented application programs typically model a problem using an "object model" that defines classes of objects representing elements of the problem. A class of objects is defined in terms of the relationship of the class to other classes, the data and properties (or attributes) associated with objects in the class, and the operations (or tasks) that can be performed on objects in the class. During execution of an object-oriented application program, instances of the classes in the object model, referred to as "objects," are produced and manipulated. Computation on these "objects" is performed by calling on "methods" defined in business logic operations associated with these "objects". For example, in an accounting management program, the various accounts are defined as the program objects. Each object, i.e., account, has attributes including account name, account number, amount deposited in the account, among others. Tasks associated with these account objects may be "get account number", "set account name", "set account amount", among others. Objects interact with each other and with the business logic code via events or messages. An object may fire an event (or send a message) in order to modify its own properties, or state. Events are received and processed by the business logic operations associated with these objects. Object-oriented programming languages are well known in the art and are described in "Programming languages" Chapter 11, p 435-483, edited by Robert W. Sebesta.

Figure 10:
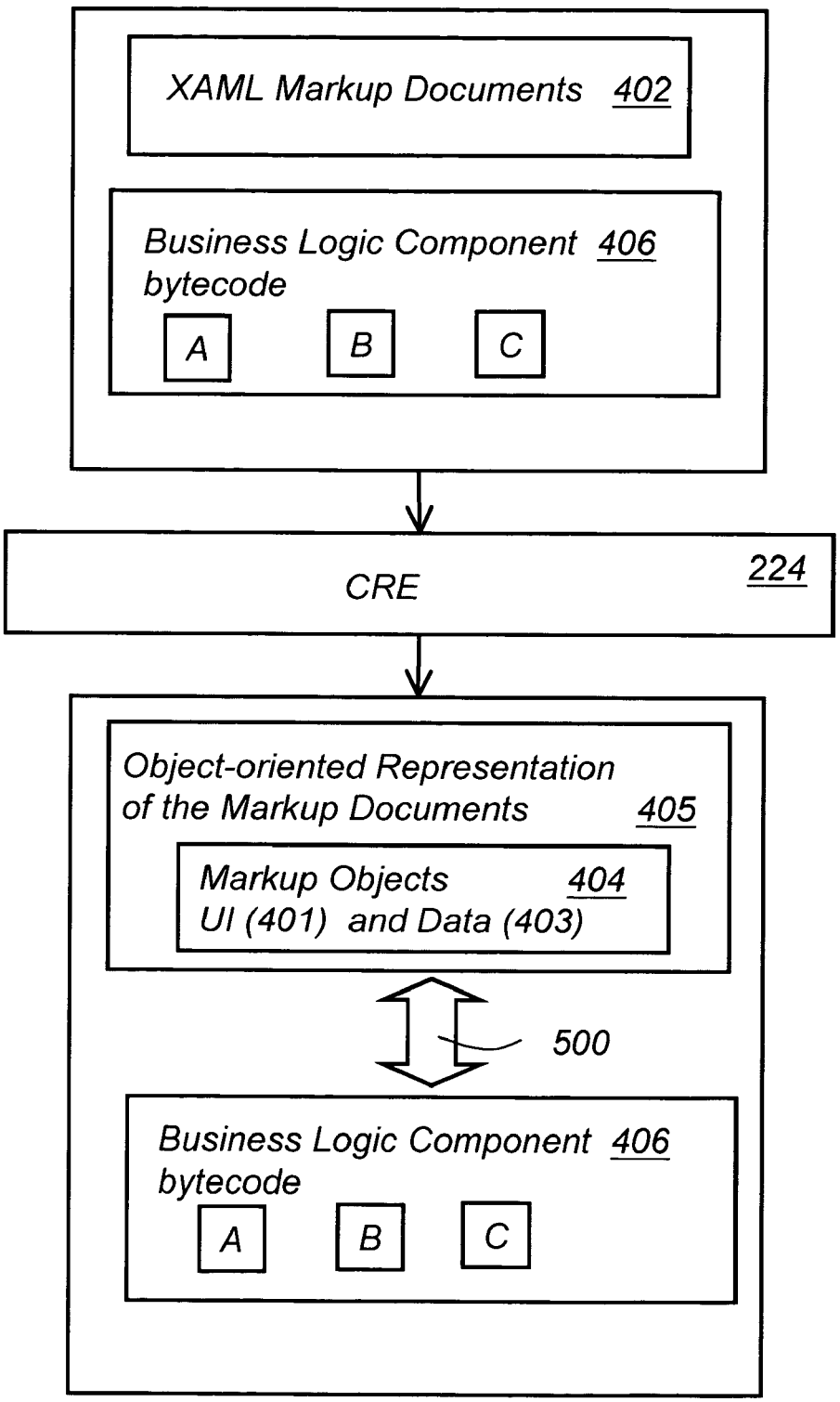
FIG. 10 is a block diagram depicting how a markup document interacts with a business logic component in an object-oriented way.

Referring to FIG. 10, the object-oriented application code 400 includes one or more markup documents 402 and one or more business logic components 406. The markup documents 402 are files written using a markup language, such as XAML, XUL, SYG, or other XML languages. The business logic components 406 include instructions for performing tasks upon the program objects. These instructions are formulated as source code files written in a programming language, such as Java™, JavaScript™, C#, Visual Basic™ (YB), J#, among others. The business logic components 406 are also program objects. The Client Runtime Environment (CRE) 120 receives the markup documents 402 and converts them into object-oriented representations, i.e., markup objects 404. The markup objects 404 may be user interfaces (UI) 401 or data 403. Each markup object 404 may have events associated with it. For example, in the case of a UI markup object that has input fields or buttons, an event may include highlighting the button or input field, entering text in the field, or clicking the button, among others. The event is received and processed by the business logic component, so that the state of the object is modified. In the example of the user interface with the input fields, where text is entered in the input fields, the business logic component modifies the UI to display the entered text. The object oriented representations of the markup documents 405 and business logic components 406 are bound via a markup-business logic binding mechanism 500.

Figure 11:
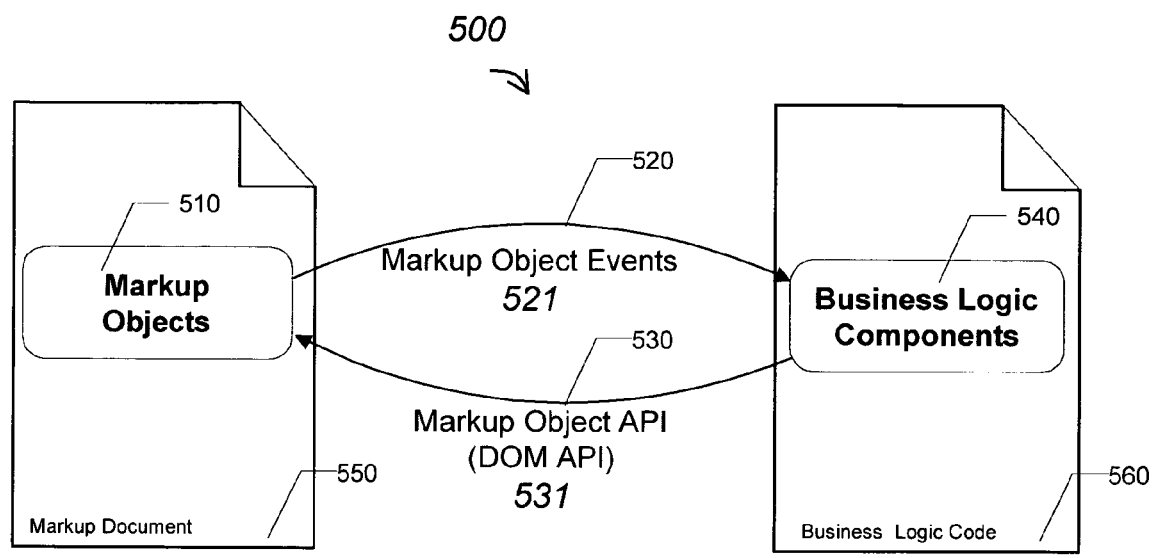
FIG. 11 is a schematic diagram of the markup-business logic binding mechanism of this invention.

Referring to FIG. 11, the markup-business logic binding 500 includes the process of binding the markup objects to the business logic components (520) and the process of binding the business logic components to the markup objects (530). In the markup object to business logic component binding 520, markup objects 510 defined in markup document 550 invoke business logic components 540 by firing markup object events 521. The business logic components 540, include definitions of methods that are used as the event handlers for the markup object events. Upon firing of an event, the CRE invokes the associated method in the corresponding business logic component, passes necessary information about the event to the method and executes the method. In the previous example of the user interface markup object that has several input fields, firing an event may be entering a user's phone number in the appropriate input field. The business logic component receives this markup object event, validates it and formats the phone number for display.

In the business component to markup objects binding 530, business logic components 540 can access and modify the markup objects 510 via a markup object Application Program Interface (API), or a Document Object Model (DOM) API, 531. In one embodiment, the CRE 224 parses and stores the markup document 550 into a DOM, and exposes this DOM as a set of API that can be invoked by business logic components 540. Business logic components 540 invoke this DOM API to programmatically manipulate the markup document 550 stored in the DOM. This feedback mechanism via the markup object API 531 may be "a form validation" process or an internal calculation that will result in modifying the markup objects 510. In an example of a "form validation" process the user enters in the UI a phone number that has three digits. The business logic component recognizes that a three digit phone number is not valid, rejects the input, displays an error in the UI and requests a valid phone number.

This two-way binding mechanism 500 enables the clear separation of the business logic components, the user interface and data. The HTML and JavaScript™ interaction models in web browsers share a similar architecture. However, the present invention differs from these prior art models because it allows for object-oriented binding. The markup documents are converted into object oriented representations (markup objects) and the business logic components become program objects as well. The object-oriented binding is then a binding between these objects, i.e., the markup objects and the program objects. In the prior art example, the business logic is written as scripts, which are not object oriented, and the binding is a binding between program methods to HTML objects. This object-oriented binding of this invention allows for the development of complex applications and provides programming language and execution format independence. In other words, the business logic code may be written in any programming language including Java™, JavaScript™, C#, J#, VB™, and C, and the markup documents may be written in any markup language and converted in any other markup language including XUL, SYG, XML, text, and HTML, among others. If the programming language is not object oriented, the source code can be compiled by the universal compiler into an object oriented executable code. Several XML specifications may be used including XUL (XML User Interface Language), SYG (Scalable Vector Graphics) and XForms. The combination of these markup languages creates a rich environment that supports all functionalities of all network applications including typical Windows graphical user interface, forms, 2D graphics and animation.

Figure 12:
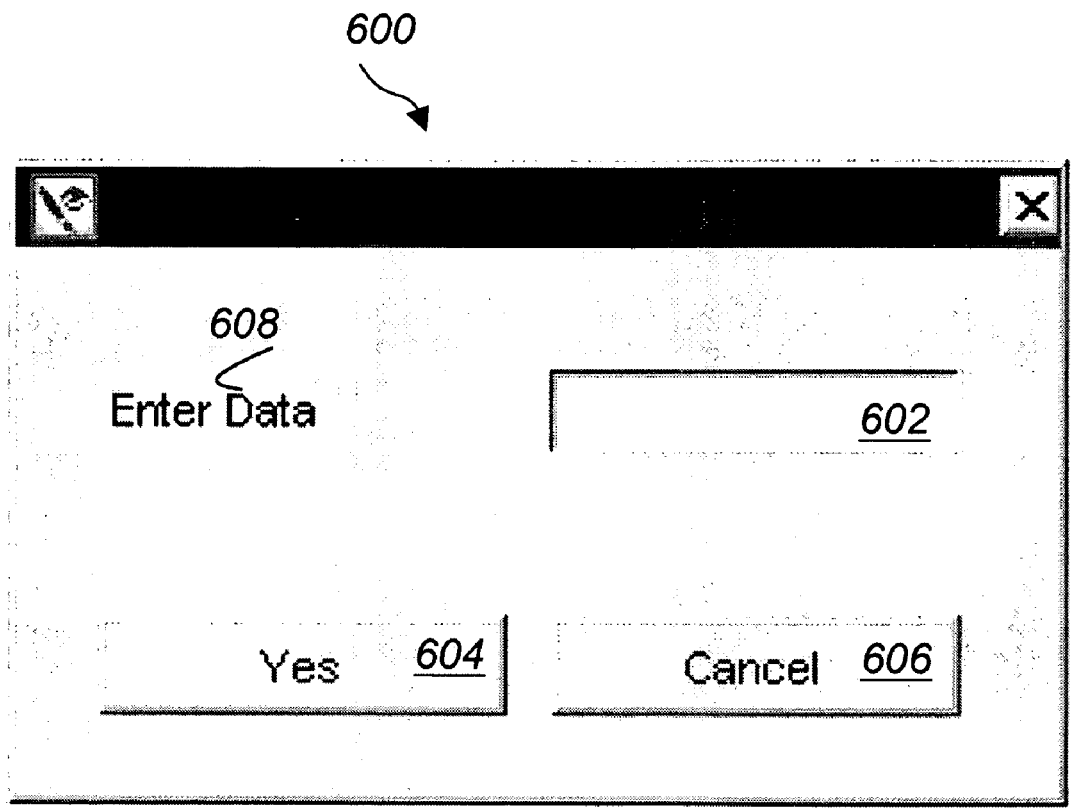
FIG. 12 is a screen shot generated with a computer application according to this invention.

A code example for the user interface shown in FIG. 12 includes the following XAML markup document and business logic component.

1. XAML Markup For the user interface (UI) Screen of FIG. 12:

```
<DockPanel  xmlns="http://schemas.microsoft.com/2003/xaml/"
            xmlns:def="Definition"
            def:CodeBehind="Dialog.xaml.cs"
            def:Class="WCSample.Dialog"
            Loaded="Init">
    <Text Margin="30,30,0,0"
        DockPanel.Dock="Top">Enter Data</Text>
    <TextBox ID="User_Data"
        Margin="30,10,0,0"
        Height="30"
        Width="150"
        DockPanel.Dock="Top"/>
    <Button ID="Yes_Button"
        Height="30"
        Width="150"
        Margin="30,30,0,0"
        Click="YesButton_Click"
        DockPanel.Dock="Bottom"/>Yes</Button>
    <Button ID="Cancel_Button"
        Height="30"
        Width="150"
        Margin="30,30,0,0"
        Click="CancelButton_Click"
        DockPanel.Dock="Bottom">Cancel</Button>
</DockPanel>
```

2. C# Code Associated with the Above XAML Markup document for the UI of FIG. 12:

```
namespace WCSample
{
    public partial class Dialog
    {
        NavigationApplication myApp;
        NavigationWindow dlgWindow;
        public void Init (object sender, EventArgs args)
        {
            myApp =     (NavigationApplication)
MSAvalon.Windows.Application.Current;
        }
        private void YesButton_Click(object sender, ClickEventArgs e)
        {
            dlgWindow = (NavigationWindow) myApp.Windows[1];
            myApp.Properties["UserData"] = User_Data.Text;
            dlgWindow.DialogResult = DialogResult.Yes;
        }
        private void CancelButton_Click(object sender, ClickEventArgs e)
        {
            dlgWindow = (NavigationWindow) myApp.Windows[1];
            dlgWindow.DialogResult = DialogResult.Cancel;
        }
    }
}
```

The XAML document defines the Text 608, the Text box 602, the Yes button 604 and the Cancel button 606 in the UI screen 600 of FIG. 12. The XAML document also connects the WCSample object with the above mentioned C# code. The C# code defines the code for processing the "YesButton-click" event, and the "CancelButton-click" event.

Figure 13:
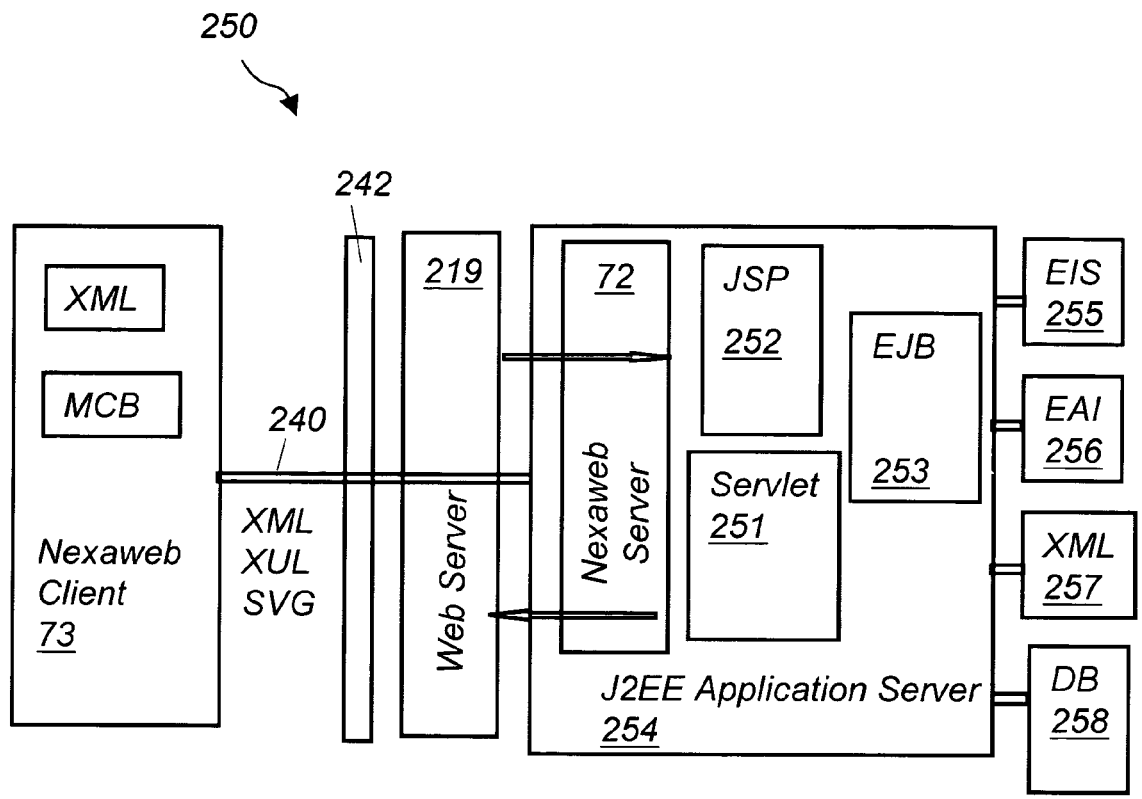
FIG. 13 is a block diagram of one example of a network-based computing system according to this invention.

An implementation of a network-based computing system according to this invention is offered by Nexaweb Technologies, of Cambridge, Mass. Referring to FIGS. 13 and 4, the Nexaweb™ network-based computing system 250 includes a Nexaweb™ Client 73 and a Nexaweb™ Server 72. Nexaweb™ Server 72 is a servlet that runs within the popular J2EE™ Application Server 254. Nexaweb™ Client 73 is an applet that dynamically downloads to any client browser when the business application is first launched. The Nexaweb™ server 72 communicates with the Nexaweb™ Client 73 and vice versa, via a network based bidirectional messaging system 240.

The Nexaweb™ Client 73 is a client-side application runtime environment (CRE) based on XML User Interface Language (XUL), Scalable Vector Graphics (SYG) and Managed Client Bean (MCB). Currently, applications are written in Java™ using a Java Development Kit (JDK™ 1.1) and an Abstract Window Toolkit (AWT™) for Java™ applications with Graphical User Interface (GUI) components, such as windows, buttons and scroll bars, as specified by the Personal Java™ Specification, which has evolved into the Java 2 Platform Micro Edition (J2ME™). Although its footprint is extremely small, the Nexaweb™ Client 73 supports user interface functionality that is comparable to Java™ Swing/ Java Foundation Class (JFC™) and Windows Microsoft Foundation Class (MFC™).

The Nexaweb™ Client 73 currently runs inside all popular web browsers 230, such as Netscape™ 4.0 and Internet Explorer™ 4.0, and on all major operating systems. To run a Nexaweb™ application inside a browser, no client-side installation is required. The basic function of the Nexaweb™ Client 73 is to render XUL/SVG. The Nexaweb Client 73 communicates with the Nexaweb™ Server 72 and retrieves the application's user interface description via XUL/SVG and renders it accordingly. The user interface functionality built into the Nexaweb™ Client 73 processes most UI operations locally. Functionality includes rendering and table sorting, among others. In addition, customized code can be transported and run solely on the client.

The Nexaweb Client 73 maintains the application state information during the session. Unlike web browsers designed to be stateless, the Nexaweb Client 73 maintains state information, eliminating the need to completely reconstruct the client state for every request/response. Only small, incremental updates are necessary. The process of maintaining state is described in U.S. application Ser. No. 10/717,784, entitled "System and method for Stateful Web-based Computing", which is commonly assigned and the contents of which are expressly incorporated herein by reference. State synchronization with the Nexaweb Server 72 is conducted via infrequent exchanges of short, compressed messages—typically only several hundred bytes per message. By combining this feature with a much higher level of intelligence on the client side, the Nexaweb architecture significantly lowers server load and network bandwidth consumption. Tests reveal that a bandwidth of eight kilobytes per second is sufficient for delivering acceptable application performance. The Nexaweb Client 73 knows when and how to communicate with the Nexaweb Server 72 in a performance-optimized manner. It detects the network environment, such as the presence of a firewall 242, 244 and whether the firewall allows socket connections, to select the best communication mechanism. It maintains a persistent connection with the server via HTTP or TCP/IP. In the event of a communications error, the Nexaweb Client 73 detects and automatically recovers from it. When an event occurs requiring server-side processing, the Nexaweb Client 73 will send the event via a standard HTTP GET or HTTP POST method to the server for processing. The process of this bidirectional communication is also described in U.S. application Ser. No. 10/717,784. The Nexaweb Client 73 also acts as a Managed Client Bean (MCB) container. A Managed Client Object (MCO) is a software component that can be dynamically relocated and executed at runtime, no matter where it initially resides on a network. An MCO runs inside an MCB container like an Enterprise Java Bean (EJB) runs inside an EJB container. One can use MCBs for client side processing including business logic, caching, calling net services and interacting with users. The Nexaweb Client 73 also has built-in support for extending client-side functionality via both Java and JavaScript. Client-side caching and skinning of the UI are also supported.

The Nexaweb Server 72 runs within a Java 2 Enterprise Edition (J2EE) Application Server just like a normal web application. Also, Nexaweb-based applications are developed, deployed, and run as normal web applications. The Nexaweb Server 72 routes HTTP requests to applications, caches their client-side state information, and provides network communications support to them transparently.

The Nexaweb Server 72 provides the following functions for the platform:

Application Event Router

To route client-side requests to the right web application instance, the Nexaweb Server 72 acts like an "application event router." It routes requests to the corresponding web application instance using the Application Server's (more precisely, the Servlet Container's) RequestDispatcher. From the viewpoint of a web application, there is no difference between an HTTP request coming directly from a client-side web browser and a request forwarded by the Nexaweb Server 72. In one example, the Application Server's Servlet Engine 251, the Java Server Page (JSP) engine 252 or the Enterprise Java Bean (EJB) container 253 are used for processing the request. All infrastructure support from the Application Server 254, such as security, HTTP session, database connectivity, messaging, and component management, is available to Nexaweb-based applications in the same way as they are to any web application.

Dynamic Cache

The Nexaweb Server 72 caches all client-side state information for server-side needs. This "dynamic cache" is a collection of proxy objects each of which correspond to a client-side user interface component. This cache is updated dynamically and transparently via a persistent connection 240 established between the Nexaweb Client 73 and Nexaweb Server 72. Any changes are instantly and automatically reflected on the client-side. The server-side logic can then dynamically update the client-side in real-time. For example, it can perform server pushes transparently by modifying this cache. This caching mechanism not only significantly reduces application development complexity, but also significantly improves application performance and enables critical functionalities such as "server push."

Network Communications Management

The Nexaweb Server 72 and the Nexaweb Client 73 can manage network communications for applications. The communications model of the World Wide Web uses "client pull" for web browsing, but does not meet the requirements for distributed computing. Distributed computing requires not only "client pull," but also "server push," which is a higher order of communications responsiveness and reliability. Meeting these requirements includes writing a lot of custom code and handling firewalls restricting network communications in and out of an enterprise. Nexaweb Server 72 does all of this work transparently by maintaining a reliable, persistent, bi-directional communications channel 242 with the Nexaweb Client 73 that operates through firewalls and can use the standard port 80 employed by web browsers. The process of this bi-directional messaging is also described in U.S. application Ser. No. 10/717,784.

An implementation of a network-based application according to this invention that utilizes the above described Nexaweb computing system is developed like a normal web application using EJBs for handling business logic, a database for storing persistent information, and Servlet/JSP for presentation. The difference is that a normal web application uses HTML for the user interface and Nexaweb uses XML for the user interface. A normal web application's Servlets/JSP pages will generate HTML and send the HTML pages to a web browser for rendering. A Nexaweb-based web application still uses Servlet/JSP, but the Servlets and JSP pages generate XML (more precisely, XML User Interface, either XUL or SVG) for the client to render. To migrate an existing web application to run on this Nexaweb platform, one needs to replace the HTML code with XML from the application's JSP pages and Servlets. The current release of Nexaweb supports the J2EE programming model. The Nexaweb Server 72 supports Servlet 2.2/JSP1.1 or higher specification. The Nexaweb Server 72 itself is developed as a J2EE application and thus runs in any standard J2EE application server.

A key benefit of the Nexaweb Client 73 is that it uses XML for the user interface. XML gives the client a high level description of the user interface, reducing not only network traffic, but also giving the client flexibility for presentation. Nexaweb adopted two XML User Interfaces standards: XML-based User Interface Language (XUL) and Scalable Vector Graphics (SVG). SVG is a World Wide Web Consortium (W3C) standard published in November 2001 for describing interactive 2D graphics over the web. XUL is an open XML-based user interface language that is still evolving at this time.

XUL in Nexaweb

XUL is an emerging approach for delivering rich, interactive UIs over the web. Similar to Java, XUL was designed for portable, cross-platform UI solutions. The XML-based characteristics of the language easily bind UIs to web services. XUL is platform and device-agnostic and can deliver a full, highly interactive user interface. XUL offers all the advantages of XML and may be easily interpreted and manipulated by other applications. With XUL, one can create most of the elements found in modern graphical interfaces. It is powerful enough to enable non-developers to quickly create sophisticated interfaces.

XUL elements include:
input controls (textboxes, drop down lists),
toolbars with buttons or other content,
menus on a menu bar or in pop up menus,
tabbed dialog boxes,
trees for hierarchical or tabular information,
keyboard shortcuts,
drag and drop support,
Multiple Document Interface, and
popup dialog boxes.

Nexaweb XUL is not 100% compatible with Mozilla XUL or other XUL dialects. Instead, Nexaweb XUL is based on these XUL specifications, but with changes. Nexaweb enhances and augments XUL functionality to include server-side application control, real-time communications and other mission-critical features.

Nexaweb also simplifies syntax for complex interface functions and converts JSP-based applications and web services into XUL on the fly. Similarly, the client can operate without the server and, with some customization, function without a network connection at all.

Nexaweb enhances the XUL standard in these ways:
Flexibility: Nexaweb allows you to add and remove GUI components on the fly.
More power: Nexaweb adds additional features that would otherwise require custom coding (for example, in-cell editing within a tree table).
More conciseness and efficiency: Nexaweb eliminates unnecessary tags, uses intuitive and consistent naming conventions and structure, and adds new tags with pre-configured parameter settings that simplify desired behaviors. For example, tree, tree-table, table all call the same underlying component with different default parameters.
Server-side integration: Nexaweb routes events of interest back to the server, allowing for more powerful server-side logic processing.

XUL constructs and terminology resemble Java's. Developers familiar with Java will easily understand the concepts and appreciate the simplicity of XUL in the Nexaweb environment.

These general concepts are fundamental to XUL UI development:
Container: A container is a type of component that can hold other components. A window, a dialog, and a panel are three types of containers.
Window: A window is a top-level display area that can contain other containers and components. You can drag it by the title bar, resize it, close it, maximize it, and minimize it.
Panel: Panels are invisible containers that refine the arrangement of components in another container. Since a panel is a container, you can set a panel's layout manager just as you would for other containers. In addition, containers can have other containers (including other panels). This structure gives the programmer increased flexibility in arranging the GUI.
Menubar: A container with properties for menu-specific functions.
Toolbar: A container with properties for menu-specific functions.
Layout Managers: XUL, like Java, uses layout managers to establish layout properties for a container. A layout manager controls the size and position of components in a container. There are six layout managers in XUL: BorderLayout, BoxLayout, CardLayout, FlowLayout, GridLayout, and GridBagLayout.

The Structure of a XUL File

A XUL file is a file in valid case-sensitive XML syntax that can be created and edited in a simple text editor. XUL files start and end with the <xul> tag.

Beneath the <xul> tag are subtags corresponding to containers. Those containers in turn hold other containers as well as layout manager tags.

Command tags such as <remove> and <beep> can also exist directly beneath the top level <xul> tag.

Figure 14:
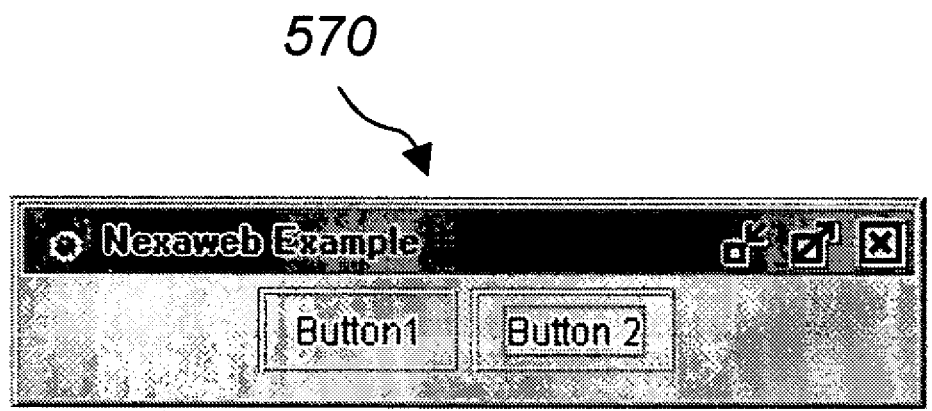
FIG. 14 is a Nexaweb example for a small window interface with two buttons.

XUL Example: a Simple Window with Two Buttons, shown in FIG. 14.

Below is code that creates a simple window with two buttons:

<!--this is a simple Window with two buttons-->

The <xul> tag must start and end each file:

<xul>

This line defines a window called Example:

<window title="Example" size="400,350" location="10, 10">

Create two buttons in the window:

<button text="Button 1"/>

<button text="Button 2"/>

Add the closing tag for the window. In this case, the buttons are enclosed between the opening and closing tag of the window because they are children of the window.

</window>

</xul>

In this example, we did not explicitly specify the layout manager for the window. We are using the default layout manager, which is FlowLayout.

Scalable Vector Graphics (SVG) in Nexaweb

SVG is an XML-based standard defined by the W3C for interactive two dimensional (2D) graphics. SVG goes beyond the capabilities of static web-based graphics formats (GIF, JPEG, etc.). SVG objects are lightweight in footprint, enlargeable (without quality degradation), searchable and structured. SVG is a vector graphics file format that enables two-dimensional images to be displayed in XML pages on the Web. Vector images are created through text-based commands formatted to comply with XML specifications. In contrast to JPEG and GIF images on the Web, which are bit-mapped and always remain a specified size, SVG images are scalable to the size of the viewing window and will adjust in size and resolution according to the window in which it is displayed.

Benefits of SVG include:
- smaller files size than regular bitmapped graphics such as GIF and JPEG files
- resolution independence, so that the image can scale down or up to fit proportionally into any size display on any type of Web device
- text labels and descriptions that can be searched by search engines
- ability to link to parts of an image
- complex animation SVG Features SVG provides the syntax for describing images in terms of graphic objects such as text to be rendered, circles or rectangles and rendering properties, such as strokes or colors. It can express these types of graphics:

Rich, static 2D graphics

SVG supports generic shapes, transforms, rich text, transparency and filter effects, to name some of the most important static features.

Dynamic 2D graphics

The Document Object Model (DOM) Application Program Interface (API), allows dynamic manipulation of SVG documents and makes dynamic graphics possible. For example, you can change the color of a circle when the mouse moves over it.

Animated graphics

Many SVG elements (such as rectangles, circles, or images) may contain animation declarations. For example, you can express, with an animation declaration, how the x-coordinate of a rectangle should change over time, and when the animation should begin or how long it should last.

Managed Client Object/Managed Client Bean

A Managed Client Object (MCO) is a software component that can be dynamically relocated to where it will be executed at runtime no matter where it initially resides on a network. When a Managed Client Object is bound to the Java language, it is called a Managed Client Bean. The Nexaweb Client is an MCO container that provides container services to MCOs. By using an MCO, one can perform all kinds of processing on the client side ranging from form validation to parsing XML to image processing. MCO and XML together create a powerful combination: XML provides a high level, declarative way of defining data and its presentation. MCO provides a way to easily manipulate the XML in a way similar to scripting, but more powerful and efficient. With Nexaweb, the entire user interface of the application is stored as an XML Document Object Model (DOM), which can be completely controlled, changed, and traversed by client beans.

The application of the above described Nexaweb computing system and the Nexaweb method of developing web-applications can revolutionize web applications by reducing bandwidth consumption, improving performance, reducing development cost and dramatically improving user experience. For the purpose of demonstrating these performance advantages, we implemented a new user interface for the original Sun's Java Pet Store J2EE application using Nexaweb's technology and compared the new implementation with the original one on bandwidth consumption, performance and development effort.

We chose Sun's Java Pet Store application as our bench mark reference since it is a well-known J2EE sample application and it represents the best practice using MVC design pattern under J2EE framework (http://java.sun.com/j2ee/blueprints/index.html).

Nexaweb's application architecture works with any J2EE application server. In this study, we chose IBM's WebSphere Application Server Advanced Edition 4.0. It comes with the Petstore sample application as a default installation.

This study does not require any modification of the business logic code and database access code. Furthermore, no single java code needs to be re-compiled and no database changes are needed. The only modifications to the existing application are JSP pages that represent the Java Petstore's screen presentation. The full source code of Nexaweb's Pet Store implementation can be downloaded from http://www.n-exaweb.com/petstore/nexaweb-jps1.1.2.zip. To view a demo of Nexaweb's Pet Store implementation, visit http://www.n-exaweb.com/petstore.html.

Reduction of Bandwidth Consumption

Testing Scenario

We chose a typical online shopping scenario to test the application bandwidth consumption between original Pet Store and Nexaweb-enabled Pet Store. The following diagram represents a typical shopping flow.

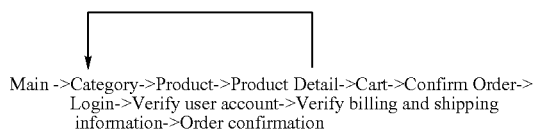

Main ->Category->Product->Product Detail->Cart->Confirm Order->Login->Verify user account->Verify billing and shipping information->Order confirmation Catalog browsing is a repeating process. Requests and responses between a browser and a server are measured by ForTech's Proxy Plus (http://www.proxyplus.cz/). The control group uses the original Pet Store and the test group uses the Nexaweb-enabled Pet Store. We went through the same shopping process described above for both the control group and the test group. All the items we added to the shopping cart are identical for both groups.

Testing Results

Table 1 summarizes the results of our testing of the bandwidth consumption. The results show that the Nexaweb-enabled Pet Store can reduce bandwidth consumption up to 90%. The result varies depending on the number of items involved. The more items are added to the cart, the more the bandwidth consumption is reduced.

TABLE 1

Bandwidth consumption comparison

| Business Scenarios | Bandwidth Consumption | | Comments |
| --- | --- | --- | --- |
| | Original Pet Store | Nexaweb Pet Store | |
| 1 item | 368.5K | 128.7K | 65% reduction |
| 5 items | 1,090.6K | 189.2K | 83% reduction |
| 10 items | 1,845.9K | 251.2K | 86% reduction |
| 15 items | 2,998.5K | 319.4K | 89% reduction |

The Nexaweb-enabled application reduces the application's bandwidth consumption because the Nexaweb's smart client caches the application's presentation logic in the client cache. Subsequent UI update requests do not require complete UI update responses, i.e., only relevant content update is sent back from the server to the client. The client is smart enough to know how to process the new content. This is fundamentally different from HTML based applications, which require redundant UI presentations to be sent back to browser even when there is only a small change in the content.

Code Example

One example will illustrate better the difference. One key application component in the Pet Store application is the shopping cart update. For the HTML based application, when a user adds a new item or removes an item from the cart, the whole cart content is sent back to the client from the server for updating. The following code snippets illustrate the original Pet Store Shopping Cart presentation logic.

```
<table bgcolor="#336666">
<tr background=". . ./images/bkg-topbar.gif" border="0">
  <th><font size="3" color="white">Item ID</font></th>
  <th><font size="3" color="white">Product Name</font></th>
  <th><font size="3" color="white">In Stock</font></th>
  <th><font size="3" color="white">Unit Price</font></th>
  <th><font size="3" color="white">Quantity</font></th>
  <th><font size="3" color="white">Total Cost</font></th>
</tr>
<j2ee:items>
  <tr bgcolor="#eeebcc">
  <td><a href="cart?action=removeItem&itemId=<j2ee:cartAttribute
attribute="itemid"/>"><img src=". . ./images/button_remove.gif"></a>
  </td>
  <td> <j2ee:cartAttribute attribute="itemid"/> </td>
  <td><j2ee:cartAttribute attribute="name"/></td>
  <td><j2ee:cartAttribute attribute="instock" true="yes"
alse="no"/></td>
  <td><j2ee:cartAttribute attribute="unitcost"/></td>
  <td><input name="itemQuantity_<j2ee:cartAttribute
attribute="itemid"/>"
     type="text"
     size="4"
     value="<j2ee:cartAttribute attribute="quantity"/>">
  </td>
  <td><j2ee:cartAttribute attribute="itemTotal"/></td>
</tr>
</j2ee:items>
</table>
```

We notice that every time there is an item update (add or remove), the entire shopping cart is rebuilt (loop through <j2ee:items> tag) and all rows in the table are sent back to the client's browser. The client's browser does not cache the cart content, but it refreshes and redisplay s the entire shopping cart.

The Nexaweb-enabled client performs the same function with a different approach. The following is a corresponding Code Snippet for Nexaweb's Pet Store Shopping Cart.

```
<xul>
<table id="cart_table" justifyh="left" borderwidth=0 visible="true">
  <remove id="Cart_<%=request.getParameter("itemId")%>" />
  <row id="Cart_<%=request.getParameter("itemId")%>">
    <cell   img="images/button_remove.gif"
oncommand="/estore/control/nncart?action=removeItem&itemId=<%=
request.getParameter("itemId")%>" />
    <cell text="<%=request.getParameter("itemId")%>" />
    <cell text="<%=request.getParameter("item_desc")%>" />
    <cell text="<%=request.getParameter("inv")%>" />
    <cell text="<%=request.getParameter("currency")%>" />
    <textbox text="<%=request.getParameter("quantity")%>" />
    <cell text="<%=request.getParameter("currency")%>" />
  </row>
</table>
</xul>
```

Nexaweb's implementation of the shopping cart table update is on the row level. In this case, the XUL code notifies the Nexaweb client that there is one row to be added to the "cart_table". Since the client keeps a state of the table, it knows how to add that row to the table. This example demonstrates how the Nexaweb-enabled application reduces the network bandwidth consumption, especially when the content/data update is huge.

Another way the Nexaweb-enabled client achieves bandwidth consumption reduction is by providing the ability to manipulate data on the client side. For example, if a user wants to sort the items in the shopping cart based on price or category, the prior art HTML based application has to send a request to the server, the server has to execute a new SQL query, reformat the result set and send back the new constructed HTML table to the client. However, since the Nexaweb's smart client has full knowledge of the table, it requires no server trip and server processing in order to render the new item order.

The above described application scenario can be extended to other applications as well, especially to Online Analytical Processing (OLAP) reporting applications. This kind of application requires frequent different views of the same data such as table sorting, graphic representation, reformatting, among others. The prior art HTML based UI offloads these requests to the server for processing. If there are lot of data involved in each screen update and there are lot of concurrent users accessing the application, this will add a tremendous challenge to the application performance and network bandwidth.

Improvement of Application Performance

Nexaweb's technology can improve application performance by reducing server load without scarifying tiered architecture. It reduces the server load by eliminating unnecessary UI rendering-related server requests. The Pet store shopping cart example illustrates this point. When a user adds or removes shopping cart items the client notifies the server's cart session object. However, the server responds by sending only the changed items back to the client for the UI update. The system does not require the server to build the whole cart contents. Also shopping cart table sorting can be done through client side manipulation without any server process involvement. This can dramatically improve application scalability and performance, especially for OLAP applications.

Improvement of the User Interface

One drawback most of HTML-based applications inherit is redundant navigation. In the Pet Store application case, to buy an item, the user has to navigate at least 10 different screens:

Main ->Category->Product->Product Detail->Cart->Confirm Order-> Login->Verify user account->Verify billing and shipping information->Order confirmation If the user decides to buy more items, he/she has to go through the same category/product/item list again. If the user wants to do comparison shopping, he/she has to do a lot of back and forth navigation which can cause the user to get lost. Nexaweb improves this situation by supporting all shopping behaviors within one window. There is no back and forth navigation. The user always has a complete view of category, product, item detail, shopping cart and user account at the same time and at any time. Nexaweb achieves this goal by utilizing rich UI components such as tree and layout managers. Event handlers such as table sorting and drag and drop give users a new level of interactivity. The same result can be achieved in the HTML frame by utilizing complex and cumbersome programming. However, programming in HTML frame in addition to being complex, it does not support rich UI components/events such as tree table, layout manager, client-side table sorting and drag and drop, among others.

Easy of Application Migration and Reduction of Development Cost

Code Modification—High Level View

For an application with tiered architecture, it is easy to migrate an existing HTML-based presentation code to an XUL-based Nexaweb presentation. The original Pet Store application is written with clear separation between presentation and business logic. This architecture makes the migration of the original Pet Store application to a Nexaweb presentation extremely easy. Only part of the presentation codes (VIEW definition JSP pages) is modified. All EJB and Flow Control codes are untouched. 4% of total files and 3.5% lines of total code are modified. For a detailed breakdown by tiers, see table below.

TABLE 2

Number of files comparison

| | Total files of original application | Number of files Modified | % |
|---|---|---|---|
| Presentation | 147 | 11 | 7.4% |
| Middle Tier | 130 | 0 | 0% |
| Database | 1 | 0 | 0% |
| Total | 278 | 11 | 4.0% |

TABLE 3

Lines of Code comparison

| | Total Lines of original Code | Lines of Code Modified | % |
|---|---|---|---|
| Presentation | 10,101 | 664 | 6.6% |
| Middle Tier | 8,451 | 0 | 0% |
| Database | 349 | 0 | 0% |
| Total | 18,891 | 664 | 3.5% |

Code Modification—Detail View

Table 4 lists the modifications of the screen definition JSP pages.

TABLE 4

Function/Screen mapping between original Pet Store and Nexaweb implementation

| Major Functions | Screen Definition | JSP Pages | Nexaweb Modification |
|---|---|---|---|
| Home page | MAIN | Index.jsp | Nexaweb2.jsp |
| Search | SEARCH | Search.jsp | Nnsearch.jsp |
| Product Category | Category | Productcategory.jsp | Nnproductcategory.jsp |
| Product | Product | Product.jsp | Nnproductcategory.jsp |
| Product details | PRODUCT_DETAIL | Productdetails.jsp | Nnproductcategory.jsp |
| Shopping cart | CART | Cart.jsp | Nncart.jsp |
| Check out | CHECK_OUT | Checkout.jsp | Nncheckout.jsp |
| Sign in | SIGN_IN | Signin.jsp | Signin.jsp |
| Sign out | SIGN_OUT | Signout.jsp | Nnsignout.jsp |
| Place order | PLACE_ORDER | Enteruserdata.jsp | Nnenteruserdata.jsp |
| Confirm order | VALIDATE_BILLING_INFORMATION | Confirmshippingdata.jsp | Nnconfirshippingdata.jsp |
| Commit order | COMMIT_ORDER | Shiporder.jsp | Nnshiporder.jsp |
| Template | TEMPLATE | Template.jsp | Template.jsp |

Code Reduction

In addition to comparing Lines of Code, we also count the number of characters in the code. Code comments and empty lines and spaces are not taken into account. We use a third party tool "LineCount" to count the Lines of Code and MS Word to count the Characters of Code. Table 5 lists the result of the Lines of Code (LOC) and Characters of Code (COC) comparison between the original Pet Store application and Nexaweb's screen definition code implementation.

TABLE 5

Lines of Code (LOC) and Characters of Code (COC) comparison between original Pet Store application and Nexaweb's screen definition code implementation.

| Criteria | Screen definition codes of Nexaweb Pet Store | Screen definition codes of Original Pet Store | Comments |
|---|---|---|---|
| Number of files | 10 | 18 | 40% reduction |
| Lines of Code (LOC) | 790 | 1179 | 33% reduction |
| Characters of Code (COC) | 25433 | 30068 | 15% reduction |

Development Time

In this study, it took a seasonal java developer with less than one year JSP/HTML development experience one week (40 man hours) to convert the existing Pet Store application into a Nexaweb/XUL presentation. The majority of time was spent on learning the original Pet Store application and the XUL syntax. The nature of the work involved was focused on reformatting HTML tags into XUL tags.

Code Comparison Breakdown

TABLE 6

Characters of Code (COC) and Lines of Code (LOC) screen definition code comparison between the original Pet Store application and the Nexaweb implementation.

| Nexaweb Pet Store Presentation | | Original Pet Store Presentation equivalent | |
|---|---|---|---|
| File name | LOC and COC | File name | LOC and COC |
| Nexaweb2.jsp | LOC: 95<br>COC: 3216 | Index.jsp<br>Sideindex.jsp splash.jsp, banner.jsp, footer.jsp | LOC: 156<br>COC: 6190 |
| Nnsearch.jsp | LOC: 22<br>COC: 875 | Search.jsp | LOC: 43<br>COC: 1185 |
| Nnproductcategory.jsp | LOC: 119<br>COC: 4400 | Productcategory.jsp<br>Product.jsp<br>Productdetails.jsp | LOC: 159<br>COC: 6753 |
| Nncart.jsp | LOC: 52<br>COC: 2084 | Cart.jsp | LOC: 107<br>COC: 2379 |
| Nncheckout.jsp | LOC: 46<br>COC: 1420 | Checkout.jsp | LOC: 73<br>COC: 1833 |
| Signin.jsp | LOC: 75<br>COC: 1137 | Signin.jsp | LOC: 51<br>COC: 802 |
| nnsigninsuccess.jsp | LOC: 176<br>COC: 7013 | Enteruserdata.jsp<br>Signinscucess.jsp<br>changeaddressform.jsp | LOC: 288<br>COC: 5521 |
| Nnconfirshippingdata.jsp | LOC: 7<br>COC: 355 | Confirmshippingdata.jsp | LOC: 67<br>COC: 1324 |
| Nnshiporder.jsp | LOC: 143<br>COC: 4933 | Shiporder.jsp | LOC: 177<br>COC: 3435 |
| Template.jsp | LOC: 0<br>COC: 0 | Template.jsp | LOC: 39<br>COC: 646 |
| TOTAL | LOC: 790<br>COC: 25433<br>Files: 10 | | LOC: 1179<br>COC: 30068<br>Files: 18 |

In conclusion the Nexaweb-enabled smart client can improve web applications by reducing bandwidth consumption by up to 90%, increasing performance by up to 50%, and improving web user interface unlimitedly. All these benefits can be achieved without requiring re-writing of the application. Migrating from an HTML presentation to a Nexaweb-enabled client is straightforward. Development time using the Nexaweb technology may be reduced by 15% to 30% compared with traditional HTML-based applications due to the elimination of redundant presentation code.

Other embodiments are within the scope of the following claims. For example, the Nexaweb Server 72 may also run outside the application server 254. Examples of business applications that could be delivered over the described distributed web-based system 200 include among others Microsoft Word for word processing applications, Microsoft Excel for spreadsheet applications, financial trading software used by portfolio managers in financial institutions, and claim processing applications used in the insurance industry.

Several embodiments of the present invention have been described. Nevertheless, it will be understood that various modifications may be made without departing from the spirit and scope of the invention. Accordingly, other embodiments are within the scope of the following claims.

What is claimed is:

1. A method of developing and deploying a network application in a distributed computing system including at least a server and at least a client machine, wherein said client machine is adapted to connect to said server via a network, said method comprising:

developing a server-side application comprising at least one markup document and at least one business logic component, wherein said markup document is written using any declarative Extensible Markup Language (XML) and said business logic component is written using any programming language;

compiling said business logic component into a specific executable code using a compiler, wherein said compiler is adapted to receive a business logic component written in any programming language and to compile said business logic component into a specific executable code that can be executed by a specific execution engine in said client machine;

converting said markup document into a specific markup language document using a markup language converter, wherein said markup language converter is adapted to receive a markup document written in any XML language and to convert said markup document into a specific markup language document that is compatible with a specific client runtime environment (CRE) of said client machine; and deploying said specific markup document and said specific executable code to said client machine via said network.

2. The method of claim 1 further comprising combining said specific markup language document and said specific executable code into one entity before said deploying to said client machine.

3. The method of claim 1 further comprising caching said specific markup language document by a client cache and executing said specific executable code by said specific execution engine in said client machine.

4. The method of claim 1 further comprising caching said compiled specific executable code and said converted specific markup language document by a server cache.

5. The method of claim 4 wherein said deploying of said specific markup document and said specific executable code occurs from said server cache.

6. The method of claim 4 further comprising caching said markup document and said business logic component by said server cache.

7. The method of claim 1 further comprising converting said markup document into a binary executable code.

8. The method of claim 1 wherein said compiling occurs on the fly and upon a request by said client machine.

9. The method of claim 1 wherein said converting occurs on the fly and upon a request by said client machine.

10. The method of claim 1 further comprising detecting the particular type of said specific client machine by said server before said compiling and said converting.

11. The method of claim 1 wherein said at least one markup document is written in Hyper Text Markup Language (HTML) language and said markup language converter converts said HTML markup document into an XML markup document.

12. The method of claim 1 wherein said specific markup language is selected from a group consisting of XML, XML User Interface Language (XUL), Scalable Vector Graphics (SVG), XForms, XML related languages, Hyper Text Markup Language (HTML), HTML related languages, text, and combinations thereof.

13. The method of claim 1 wherein said programming language is selected from a group consisting of C, C++, C#, Java™, Javascript™, VBScript, ActionScript™, Visual Basic™, XSL, XQuery™, XPath™, and a proprietary programming language.

14. The method of claim 1 wherein said specific execution engine is selected from a group consisting of .NET CLR, JVM™, Flash Player™, and Javascript™ engine.

15. The method of claim 1 wherein said specific executable code comprises a format selected from a group consisting of .NET CLR, Java™ class format, and Macromedia Flash™ binary format.

16. The method of claim 1 wherein said network is selected from a group consisting of the World Wide Web (www), the Internet, a wide area network (WAN), a local area network (LAN), a personal area network (PAN), a telecommunication network, a virtual private network (VPN) and a wireless network.

17. The method of claim 1 wherein said client machine is selected from a group consisting of a desktop computer, a workstation, a Linux machine, computing circuits, a laptop computer, a handheld device, a television, a telephone, a smart phone, a mobile phone, a personal digital assistant (PDA), a pager, wireless computers, and combinations thereof.

18. The method of claim 1 wherein said compiler comprises a plurality of specific programming language universal compilers and a server compiler control logic.

19. The method of claim 18 wherein said server compiler control logic detects the type of a specific client engine, invokes compiling and caching of a specific client engine executable code and delivers said executable code to said client engine.

20. The method of claim 18 wherein said each of said specific programming language universal compilers receives an input file written in any programming language and compiles said input file into a specific executable code that can be executed by a specific execution engine.

21. The method of claim 1 wherein said markup language converter comprises a control logic and specific markup language converters.

22. The method of claim 21 wherein said control logic detects the type of a specific client engine, invokes a specific markup language converter that is appropriate for said specific client engine and converts said markup document into said specific markup language document.

23. A distributed computing system for developing and deploying a smart client application from a server to a client machine via a network, said system comprising:
    a server-side application comprising at least one markup document and at least one business logic component, wherein said markup document is written using any declarative Extensible Markup Language (XML) and said business logic component is written using any programming language;
    a compiler for compiling said business logic component into a specific executable code, wherein said compiler is adapted to receive a business logic component written in any programming language and to compile said business logic component into a specific executable code that can be executed by a specific execution engine in said client machine;
    a markup language converter for converting said markup document into a specific markup language document, wherein said markup language converter is adapted to receive a markup document written in any XML language and to convert said markup document into a specific markup language document that is compatible with a specific client runtime environment (CRE) of said client machine; and
    a network server for deploying said specific markup document and said specific executable code to said client machine via said network.

24. The system of claim 23 further comprising combining said specific markup language document and said specific executable code into one entity before said deploying to said client machine.

25. The system of claim 23 further comprising caching said specific markup language document by a client cache and executing said specific executable code by said specific execution engine in said client machine.

26. The system of claim 23 further comprising caching said compiled specific executable code and said converted specific markup language document by a server cache.

27. The system of claim 26 wherein said deploying of said specific markup document and said specific executable code occurs from said server cache.

28. The system of claim 26 further comprising caching said markup document and said business logic component by said server cache.

29. The system of claim 23 further comprising converting said markup document into a binary executable code.

30. The system of claim 23 wherein said compiling occurs on the fly and upon a request by said client machine.

31. The system of claim 23 wherein said converting occurs on the fly and upon a request by said client machine.

32. The system of claim 23 further comprising detecting the particular type of said specific client machine by said server before said compiling and said converting.

33. The system of claim 23 wherein said at least one markup document is written in HTML language and said markup language converter converts said HTML markup document into an XML markup document.

34. The system of claim 23 wherein said specific markup language is selected from a group consisting of XML, XML User Interface Language (XUL), Scalable Vector Graphics (SYG), XForms, XML related languages, Hyper Text Markup Language (HTML), HTML related languages, text, and combinations thereof.

35. The system of claim 23 wherein said programming language is selected from a group consisting of C, C++, C#, Java™, Javascript™, VBScript, ActionScript™, Visual Basic™, XSL, XQuery™, XPath™, and a proprietary programming language.

36. The system of claim 23 wherein said specific execution engine is selected from a group consisting of .NET CLR, JVM™, Flash Player™, and Javascript™ engine.

37. The system of claim 23 wherein said specific executable code comprises a format selected from a group consisting of .NET CLR, Java™ class format, and Macromedia Flash™ binary format.

38. The system of claim 23 wherein said network is selected from a group consisting of the World Wide Web (www), the Internet, a wide area network (WAN), a local area network (LAN), a personal area network (PAN), a telecommunication network, a virtual private network (VPN) and a wireless network.

39. The system of claim 23 wherein said client machine is selected from a group consisting of a desktop computer, a workstation, a Linux machine, computing circuits, a laptop computer, a handheld device, a television, a telephone, a smart phone, a mobile phone, a personal digital assistant (PDA), a pager, wireless computers, and combinations thereof.

40. A method of converting a prior art web application into a client application capable of running in distributed computing system, wherein said prior art web application comprises at least one HTML markup document and at least one business logic code and wherein said distributed computing system comprises at least a server having a Server Runtime Environment (SRE) and at least a client machine having a Client Runtime Environment (CRE) and wherein said client machine is adapted to connect to said server via a network, and wherein said method comprising:
converting said HTML markup document into an XML markup language document using a server markup language converter contained within said SRE;
deploying said XML markup document and said at least one business logic code separately from each other to said client machine via said network; and
executing said at least one business logic code and said XML markup document by said CRE.

41. The method of claim 40 further comprising providing an additional business logic code by said CRE.

42. The method of claim 40 further comprising compiling said at least one business logic code into an executable byte-code.

43. The method of claim 40 wherein said prior art web application comprises a Longhorn application.

44. A method of developing and deploying a network application in a distributed computing system wherein said distributed computing system comprises at least a server having a Server Runtime Environment (SRE) and at least a client machine having a Client Runtime Environment (CRE), said method comprising:
developing a server-side business logic using a method selected from a group consisting of Enterprise Java Beans (EJB™), .NET objects, script language, Perl™ language, and PHP™ language;
developing a server-side presentation layer using a method selected from a group consisting of Java Server Page (JSP™), Servlet, Active Server Page (ASP™), ASP-.NET, Perl™ and PHP™; and
generating XML documents based on said server-side business logic and said server-side presentation layer by said SRE and sending said XML documents to said CRE.

45. The method of claim 44 further comprising receiving said XML documents by said CRE, processing said XML documents by said CRE and presenting a rich User Interface (UI) by said CRE.

46. The method of claim 44 further comprising processing said XML documents by said SRE and sending said processed XML documents to said CRE and presenting a rich User Interface (UI) by said CRE.

* * * * *